(12) United States Patent
Artico et al.

(10) Patent No.: US 10,540,737 B2
(45) Date of Patent: Jan. 21, 2020

(54) PROCESSING UNIT PERFORMANCE PROJECTION USING DYNAMIC HARDWARE BEHAVIORS

(71) Applicant: International Business Machines Corporation, Armonk, NY (US)

(72) Inventors: Fausto Artico, Santo Stino di Livenza (IT); Jose R. Brunheroto, Mohegan Lake, NY (US); Juan Gonzalez Garcia, Yorktown Heights, NY (US); Nelson Mimura Gonzalez, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/852,450

(22) Filed: Dec. 22, 2017

(65) Prior Publication Data
US 2019/0197653 A1  Jun. 27, 2019

(51) Int. Cl.
*G06F 1/329* (2019.01)
*G06T 1/20* (2006.01)
(Continued)

(52) U.S. Cl.
CPC ............... *G06T 1/20* (2013.01); *G06F 1/324* (2013.01); *G06F 1/325* (2013.01);
(Continued)

(58) Field of Classification Search
CPC ....................................................... G06T 1/20
(Continued)

(56) References Cited

U.S. PATENT DOCUMENTS 8,643,656 B2  2/2014 Li et al.
9,804,946 B2 * 10/2017 Conlon ............... G06F 11/3612
(Continued)

FOREIGN PATENT DOCUMENTS

CN  106326047 A  1/2017

OTHER PUBLICATIONS

Juan Gonzalez, Judit Gimenez, Jesus Labarta. Automatic detection of parallel applications computation phases. IEEE International Symposium on Parallel and Distributed Processing. 2009.
(Continued)

*Primary Examiner* — Evral E Bodden
(74) *Attorney, Agent, or Firm* — Patterson + Sheridan, LLP

(57) ABSTRACT

Methods for estimating accelerator performance for dynamic hardware behaviors are disclosed. Computer program code to be executed on a first processing unit is received, and an execution of the computer code on the first processing unit is monitored to determine a plurality of performance characteristics. A plurality of dynamic hardware behaviors is determined by applying a clustering algorithm to the performance characteristics, and an equivalent accelerator portion of computer code to be executed on a second processing unit is generated by translating a set of instructions in a first portion of computer code corresponding to a first one of the plurality of dynamic hardware behaviors to an equivalent set of instructions to be executed on the second processing unit. An estimated measure of performance for executing the equivalent accelerator portion on the second processing unit is determined for the first one of the plurality of dynamic hardware behaviors.

20 Claims, 13 Drawing Sheets

(51) Int. Cl.
*G06F 1/324* (2019.01)
*G06F 11/34* (2006.01)
*G06F 1/3234* (2019.01)
*G06N 20/00* (2019.01)

(52) U.S. Cl.
CPC .... *G06F 11/3409* (2013.01); *G06F 2201/805* (2013.01); *G06N 20/00* (2019.01)

(58) Field of Classification Search
USPC ........................................................ 717/102
See application file for complete search history.

(56) References Cited

U.S. PATENT DOCUMENTS

| | | | |
|---|---|---|---|
| 2003/0167389 A1* | 9/2003 | Soltis, Jr. | G06F 9/3842 712/220 |
| 2011/0035746 A1* | 2/2011 | Takai | G06F 8/30 718/100 |
| 2014/0063026 A1 | 3/2014 | Oh | |
| 2014/0257780 A1* | 9/2014 | Jing | G01V 99/005 703/6 |
| 2015/0317563 A1 | 11/2015 | Baldini Soares et al. | |
| 2017/0026266 A1 | 1/2017 | Krutsch et al. | |
| 2017/0053620 A1 | 2/2017 | Law et al. | |

OTHER PUBLICATIONS

German Llort, Juan Gonzalez, Harald Servat, Judit Gimennez, Jesus Labarta. On-line detection of large-scale parallel application,s structure. IEEE International Symposium on Parallel and Distributed Processing. 2010.

Andrew Kerr, Gregory Diamos, and Sudhakar Yalamanchili. Modeling GPU-CPU Workloads and Systems. Proceedings of the 3rd Workshop on General-Purpose Computation on Graphics Processing Units. 2010.

Matthew Marangoni, Thomas Wischgoll. Togpu: Automatic Source Transformation from C++ to CUDA using Clang/LLVM. Society for Imaging Science and Technology. Visualization and Data Analysis. 2016.

Erzhou Zhu, Haibing Guan, Guoxing Dong, Yindong Yang, Hongbo Yang. A Translation Framework for Executing the Sequential Binary Code on CPU/GPU Based Architectures. International Symposium on Parallel Architectures, Algorithms and Programming. 2010.

Newsha Ardalani, Clint Lestourgeon, Karthikeyan Sankaralingam, Xiaojin Zhu. Cross-Architecture Performance Prediction (XAPP) Using CPU Code to Predict GPU Performance. Proceedings of the 48th International Symposium on Microarchitecture. 2015.

Ioana Baldini, Stephen J. Fink, Erik Altman. Predicting GPU Performance from CPU Runs Using Machine Learning. IEEE International Symposium on Computer Architecture and High Performance Computing. 2014.

Mitesh R. Meswani, Laura Carrington, Didem Unat, Allan Snavely, Scott Baden, Stephen Poole. Modeling and Predicting Performance of High Performance Computing Applications on Hardware Accelerators. IEEE Parallel and Distributed Processing Symposium Workshops & PhD Forum. 2012.

Juan Gonzalez, Marc Casas, Judit Gimenez, Miguel Moreto, Alex Ramirez, Jesus Labarta, Mateo Valero. Simulating whole supercomputer applications. IEEE Micro (vol. 31, Issue 3). 2011.

Jiayuan Meng, Vitali A. Morozov, Kalyan Kumaran, Venkatram Vishwanath, Thomas D. Uram. Grophecy: GPU performance projection from CPU code skeletons. Proceedings of 2011 International Conference for High Performance: Computing, Networking, Storage and Analysis. 2011.

Shuai Che, Kevin Skadron. BenchFriend: Correlating the Performance of GPU Benchmarks. International Journal of High Performance Computing Applications. 2013.

\* cited by examiner

PROCESSING UNIT PERFORMANCE PROJECTION USING DYNAMIC HARDWARE BEHAVIORS

GOVERNMENT RIGHTS IN THIS INVENTION

This invention was made with Government support under Contract No.: 7216497awarded by Department of Energy. The Government has certain rights in this invention.

BACKGROUND

The present invention relates to improving performance of computer code, and more specifically, to using cluster analysis to dynamically transfer execution of computer code across disparate processing unit architectures during runtime.

There are a large number of processing unit (PU) architectures capable of executing computer code. Frequently, computer code is expressly designed to be executed on a particular type of PU, such as a central processing unit (CPU) or graphics processing unit (GPU), and the code cannot be executed on other types of PU without substantial translation, which requires significant time and effort. Generally, most code is executed on a particular type of processing unit (e.g., C++ is usually executed using a CPU). At times, however, it is desirable to execute code on a different type of PU that it ordinarily would not be executed on. For example, code ordinarily executed on a CPU may be better executed on a GPU in some instances.

Porting such code to the second PU, however, often involves considerable wasted time because large portions of the code may be better executed on the original PU, such that the translation effort is wasted and the resulting translated code is useless. Furthermore, some code is better executed on a GPU when it is run in parallel with other portions of code, but on a CPU when it is run in isolation. And in my circumstances, developers may be unable to determine which processing architecture is optimal for the execution of a particular piece of computer code, without experimenting with executing the particular piece of computer code across multiple different PU architectures. Additionally, many computer program codes can be organized into blocks of code. Frequently, porting an entire block of code is unnecessary, and it would be more efficient (e.g., the program would run more quickly) if one or more smaller portions of the block are ported rather than the entire block. Similarly, at times the most efficient code is created by porting a portion of the code that includes sections from multiple logical blocks of code (e.g., blocks that are executed simultaneously or sequentially).

There is no satisfactory solution to a priori predict the acceleration that can be achieved by porting all or portions of computer code to other processing unit architectures. Moreover, there is no satisfactory solution to dynamically transfer execution of computer code between disparate processing unit architectures during runtime.

SUMMARY

According to one embodiment of the present disclosure, a method is provided. The method includes receiving computer program code to be executed on a first processing unit, and monitoring an execution of the computer code on the first processing unit to determine a plurality of performance characteristics. Additionally, the method includes determining a plurality of dynamic hardware behaviors by applying a clustering algorithm to the plurality of performance characteristics. The method further includes generating an equivalent accelerator portion of computer program code to be executed on a second processing unit, by translating a set of instructions in a first portion of computer program code corresponding to a first one of the plurality of dynamic hardware behaviors to an equivalent set of instructions to be executed on the second processing unit, and determining, for the first one of the plurality of dynamic hardware behaviors, an estimated measure of performance for executing the equivalent accelerator portion on the second processing unit.

According to a second embodiment, a method is provided. The method includes determining, during execution of a first portion of computer code on a first processing unit, that a first dynamic hardware behavior of a plurality of dynamic hardware behaviors will occur at a subsequent point in time, based on a second dynamic hardware behavior that is occurring. The method also includes determining to execute code corresponding to the first dynamic hardware behavior on a second processing unit, rather than the first processing unit, and scheduling computer program code corresponding to the first dynamic hardware behavior to execute on the second processing unit rather than the first processing unit. Additionally, the method includes scheduling a remaining portion of the computer code to execute on the first processing unit upon completion of execution of the computer code corresponding to the first dynamic hardware behavior.

According to a third embodiment of the present disclosure, a method is disclosed. The method includes receiving machine code configured for a first architecture of a first processing unit, simulating execution of the machine code on the first processing unit, and monitoring the simulated execution to determine a plurality of performance characteristics. The method also includes determining a plurality of dynamic hardware behaviors by applying a clustering algorithm to the plurality of performance characteristics, and generating an equivalent accelerator portion of machine code configured for a second architecture of a second processing unit, by translating a set of instructions in a first portion of machine code corresponding to a first one of the plurality of dynamic hardware behaviors to an equivalent set of instructions configured for the second architecture.

Other embodiments include, without limitation, a computer-readable medium that includes instructions that enable a processing unit to implement one or more aspects of the disclosed methods, as well as a system having a processor, memory, and application programs configured to implement one or more aspects of the disclosed methods.

DETAILED DESCRIPTION

Figure 1:
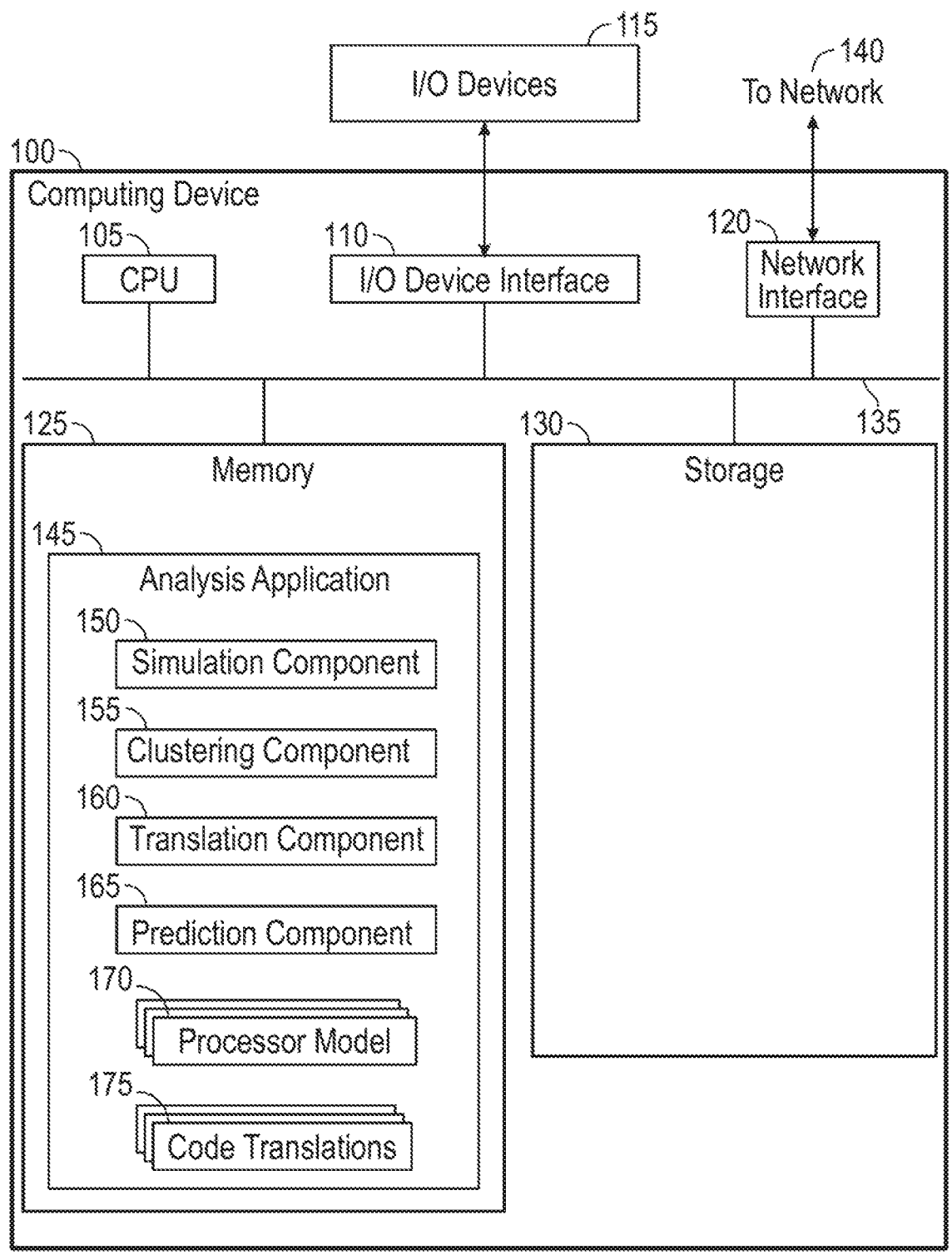
FIG. 1 is a block diagram illustrating a computing device capable of implementing an embodiment of the present disclosure.

Frequently, computer code can run more efficiently or more quickly on a different processing unit architecture than the one it ordinarily executes on. This is particularly true when optimizing older code, such as legacy code, to execute on modern computers. For example, CPU-bound tasks (also referred to as compute-bound) are limited by the speed of the CPU. Some CPU-bound tasks, however, could run more efficiently or more quickly when executed on a GPU instead. Common examples include deep learning algorithms, dense data analytics, physics simulations, and other similar tasks. Typically, some code may run more efficiently on a GPU because of the differing architecture of the GPU, as compared to the CPU. For example, a typical CPU has an architecture designed with a small number of cores to optimize sequential execution. A GPU, in contrast, is typically designed with massively parallel architecture to handle a large number of tasks simultaneously.

Of course, embodiments of the present disclosure can be applied to predict performance of code when ported from and to any processing unit, and not simply from a CPU to a GPU. For example, the code may be written to execute on a GPU, and embodiments of the present disclosure can predict performance of porting all or some of the code to a CPU. Any other computer processing unit can be used, including a cryptographic accelerator, quantum processing unit, field-programmable gate array (FPGA), and the like. Additionally, embodiments of the present disclosure are applicable to translations from a specific processing unit architecture to another architecture of the same type of processing unit. For example, embodiments of the present disclosure can be applied to porting code from a first CPU architecture to a second CPU architecture. Embodiments of the present disclosure are generally applicable to porting code between any processing unit architectures, regardless of how similar or dissimilar. As used herein, the architecture to which the code is ported is generally referred to as the accelerator architecture.

In embodiments, the computer code which is to be optimized can be in any language. Similarly, the computer code may be high-level code, with significant abstraction from the hardware (e.g., Java, C, etc.), or low-level code (e.g., machine code, assembly, etc.). Typically, low-level languages can be executed on a small number of PU architectures (often a single architecture), while high-level languages can be compiled to run on different architectures, depending on the compiler used and the settings of the compiler.

Frequently, code optimization requires porting some portions of code to an accelerator, while allowing other portions of code to execute on the original architecture. However, identifying which portions of code to translate to the accelerator architecture is time-consuming and inaccurate. Furthermore, when multiple functions or processes within a single application execute in parallel, unpredictable dynamics can cause significant slowdowns that would be improved by executing those portions of the code on an accelerator. It is impossible for a user to identify or predict these dynamics, however. In order to determine whether a program would benefit from having portions of it ported to a different processing unit architecture, identifying these dynamics is crucial.

Furthermore, in many applications, it is insufficient to simply determine whether an accelerator should be used. Rather, it is frequently important to determine how much benefit will be gained by the translation. For example, in many instances, it is important to predict how much efficiency will be gained by porting all or portions of computer code to an accelerator architecture (e.g., a GPU), to determine whether the process will be worth the result, and which portions to focus efforts on. That is, where porting a given piece of computer code to a GPU may produce a relatively insignificant efficiency gain, the process may involve more time and effort than it is worth. Similarly, where the improvements are small, the process required to dynamically switch execution to the GPU, as will be discussed in more detail below, may exceed the minimal efficiency gains.

An embodiment of the present disclosure involves identifying clusters of dynamic hardware behaviors, without regard to the actual functions or portions of computer code that are being executed. That is, rather than identifying and clustering similar functions (e.g., methods, classes, and the like), or blocks of code (e.g., lines of code or instructions) the system clusters similar behaviors of the processing unit hardware during windows of time during execution. Thus, in an embodiment, the system monitors the dynamic hardware behaviors of the processing unit, e.g., by monitoring hardware performance counters of the processing unit, and identifies windows of time where the processing unit hardware is undergoing similar dynamics, without regard for what particular block(s) of code or function(s) are being executed.

For example, a program may have any number of functions or logical blocks of code: hundreds, thousands, or more. In an embodiment, the system does not identify similar functions. Rather, during execution of the program, the performance of the hardware is monitored, and windows of time are clustered based on patterns of hardware behavior without regard to which portion(s) of the program are being executed. Thus, a dynamic hardware behavior cluster may include portions of computer code that split any given function or logical block of code into many different blocks, portions that span multiple functions, and/or portions that only occur when two or more functions execute simultaneously.

In an embodiment, because the system monitors and clusters dynamic hardware behavior, a single section of computer code may be assigned to several different clusters, depending on other sections of code that execute alongside the particular section at various points during execution of the program, data used by the section of code, and the like. For example, at one point during execution, the first portion of a first function (Function X) may execute in parallel with a first portion of a second function (Function Y). At a later point during execution, the first portion of Function X may execute in parallel with a first portion of a third function (Function Z). In an embodiment, the system may identify the window of time during which Function X executes in parallel with Function Y as belonging to a first Cluster A, while the second window of time during which Function X runs in parallel with function Z belongs to a second Cluster B. Thus, the fact that Function X is executing is entirely irrelevant, and the only consideration when clustering the behaviors is what dynamics are occurring on the hardware itself.

FIG. 1 is a block diagram illustrating a Computing Device 100 capable of implementing an embodiment of the present disclosure. As illustrated, Computing Device 100 includes a CPU 105, I/O Device Interface 110, Network Interface 120, Memory 125, and Storage 130, as well as a bus or interconnect 135. As illustrated, I/O Device Interface 110 may be used to interface with one or more I/O Devices 115, such as a keyboard, mouse, display, and the like.

The CPU 105 is configured to retrieve and execute programming instructions stored in the memory 125 and storage 130. Similarly, the CPU 105 is configured to store and retrieve application data residing in the memory 125 and storage 130. The interconnect 135 is configured to move data, such as programming instructions and application data, between the CPU 105, storage unit 130, network interface 120, memory 125, and I/O Device Interface 110. The CPU 105 is included to be representative of a single CPU, multiple CPUs, a single CPU having multiple processing cores, and the like. Memory 125 is generally included to be representative of a random access memory. The network interface 120 is configured to transmit data via the communications network 140. Although shown as a single unit, the storage 130 may be a combination of fixed and/or removable storage devices, such as fixed disc drives, removable memory cards, optical storage, SSD or flash memory devices, network attached storage (NAS), or connections to storage area-network (SAN) devices.

As illustrated, Memory 125 includes an Analysis Application 145. Although illustrated as a software application residing in Memory 125, Analysis Application 145 may, in some embodiments, reside in Storage 130 or in another storage location. Furthermore, in some embodiments, Analysis Application 145 is implemented through one or more hardware components rather than in software. As illustrated, Analysis application 145 includes a Simulation Component 150, Clustering Component 155, Translation Component 160, Prediction Component 165, a plurality of Processor Models 170, and a plurality of Code Translations 175. As above, Simulation Component 150, Clustering Component 155, Translation Component 160, and Prediction Component 165 are implemented as hardware modules in some embodiments, rather than as software residing in Memory 125.

As will be discussed in more detail below, Simulation Component 150 is generally configured to simulate execution of computer code on a given Processor Model 170. Analysis Application 145 may utilize any number of Processor Models 170 to determine dynamic hardware behaviors of the computer code when executed on the various Processor Models 170. For example, in an embodiment, Simulation Component may simulate execution of computer code on a first Processor Model 170 representing a particular CPU architecture, and simulate execution of equivalent computer code that has been translated to a second architecture on a second Processor Model 170 representing a particular GPU architecture. In some embodiments, rather than simulate execution of computer code using Simulation Component 150, the code may be actually executed, for example, on CPU 105. Additionally, if the Computing Device 100 is configured with a processing unit designed according to a different accelerator architecture, the equivalent translated code may be executed on the accelerator hardware rather than using Simulation Component 150.

In an embodiment, during execution of computer code, Clustering Component 155 monitors the execution to identify dynamic hardware behavior clusters. As discussed above, this may comprise monitoring actual execution, or monitoring a simulated execution, for example, using Simulation Component 150. Clustering of dynamic hardware behaviors will be discussed in more detail below. In the illustrated embodiment, once one or more dynamic hardware behaviors have been identified, Translation Component 160 can be used to generate equivalent accelerator clusters. For example, Translation Component 160 can utilize Code Translations 175 to generate portions of accelerator code that are equivalent to computer code in each identified cluster, as will be discussed in more detail below.

In the illustrated embodiment, once each identified dynamics cluster has been translated to an equivalent accelerator cluster, the accelerator clusters are either executed and monitored, or execution is simulated using Simulation Component 150 and the appropriate Processor Model 170. In some embodiments, the target accelerator architecture is determined by which Processor Model(s) 170 and Code Translation(s) 175 are available. In an embodiment, the particular target accelerator architecture is selected by a user. In some embodiments, Analysis Application 145 may generate predictions for each Processor Model 170 available. That is, for each accelerator Processor Model 170, Analysis Application may generate equivalent accelerator clusters using Code Translations 175 and execute (or simulate execution of) the clusters. Advantageously, this allows for the identification of which architecture is optimal for each particular cluster. Of course, each cluster may have a different optimal Processor Model 170 architecture.

In a related embodiment, rather than generating translations for all available architectures, Analysis Application 145 may use one or more target accelerator architectures that are likely to produce optimal results. For example, in an embodiment, each cluster can be processed with one or more machine learning algorithms to identify one or more potentially optimal processor architectures, and the cluster is then translated to each of the one or more potentially optimal processor architectures for prediction. That is, in an embodiment, when the optimal Processor Model 170 is determined for a given dynamics cluster, one or more machine learning models may be trained by providing data about the dynamics cluster (e.g., the number of instructions it contains, the types of instructions, the number of cache misses, and the like) as input, and the determined Processor Model 170 as target output. In this way, the machine learning models can be trained to provide one or more Processing Models 170 that are potentially the optimal architecture, which facilitates the prediction process.

As illustrated in FIG. 1, Prediction Component 165 is configured to generate predictions about the performance that would result from executing code associated with each cluster on a particular target Processor Model 170. For example, during or after execution or simulation of the equivalent accelerator cluster, Prediction Component 165 may track the total runtime of each accelerator cluster. In some embodiments, this runtime may be compared to the runtime required for the original cluster on the original Processor Model 170 architecture. This allows Prediction Component 165 to estimate not only how long each cluster would take to execute on the selected Processor Model 170, but also how this runtime compares to the original computer code. For example, Prediction Component 165 may estimate not only how long it will take to execute a given cluster on the target architecture, but also how much this would reduce the total runtime of the application, as well as the acceleration rate (e.g., by what factor would the execution be sped up).

In an embodiment, Prediction Component 165 estimates the efficiency achieved by porting a cluster to an accelerator architecture. For example, in some embodiments, the code efficiency includes not only the speed of the execution, but also the reliability of that estimated runtime. For example, if the Prediction Component 165 determines that the worst-case runtime on the target architecture is substantially higher than an estimated average runtime, the efficiency of the equivalent accelerated cluster may be affected. Similarly, in an embodiment, the estimated efficiency may include a general reliability of executing the code on the target architecture, resource consumption (e.g., computational resources and energy resources) of executing the code on the target architecture, and the like.

Once the optimal Processor Model 170 is determined for each behavior cluster, Analysis Application 145 may proceed in a variety of ways, as will be discussed in more detail below. In some embodiments, all clusters that were improved by the translation are flagged for execution using the selected Processor Model(s) 170 architecture(s) during future execution. In some embodiments, only clusters which exceed a predefined measure of performance are ported to the identified Processor Model(s) 170 architecture(s). In an embodiment, the predefined measure of performance is user-selectable. For example, if the predicted acceleration of a particular cluster is below a threshold, it may not be worth the efforts involved in porting the code and switching execution to the second architecture. This may be because, for example, the improved runtime is partially or entirely negated by the added costs and time required to achieve the translation and execution on the second processing unit.

Figure 2A:
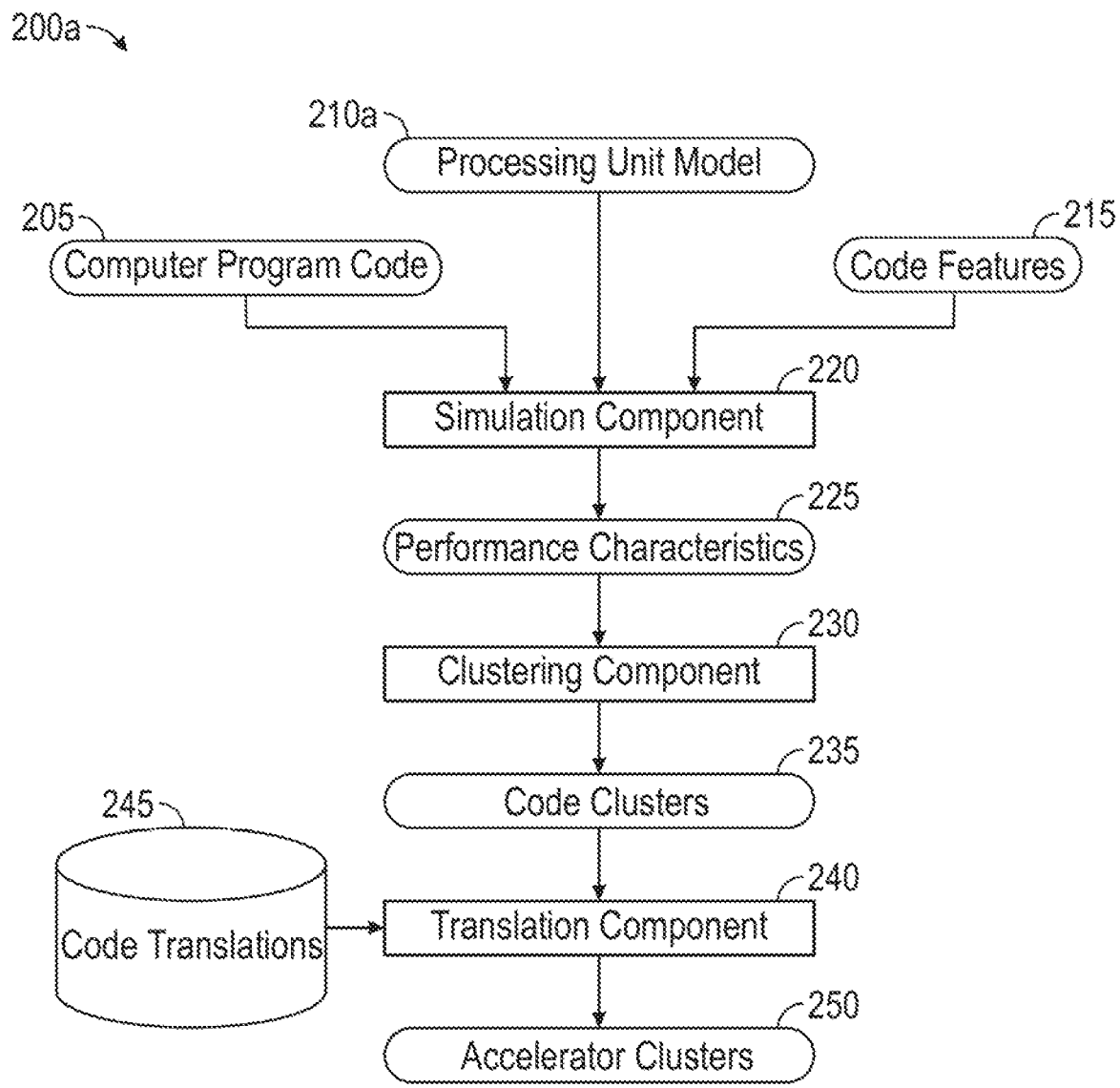
FIGS. 2A and 2B are block diagrams illustrating a workflow involved in predicting accelerator performance, according to one embodiment disclosed herein.
Figure 2B:
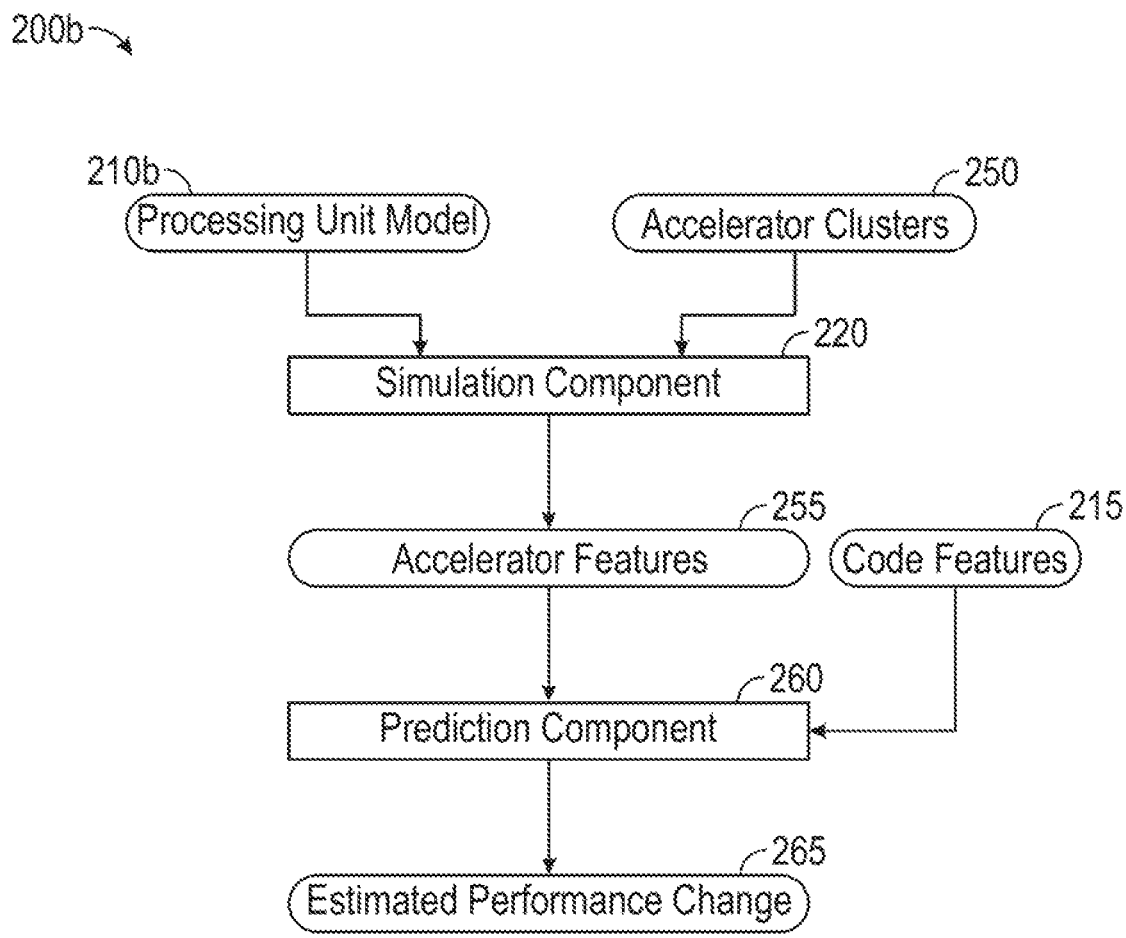

FIGS. 2A and 2B are block diagrams illustrating a workflow 200a and 200b involved in predicting accelerator performance, according to one embodiment disclosed herein. The illustrated embodiment in FIG. 2A begins with Computer Program Code 205 and results in one or more generated Accelerator Clusters 250. FIG. 2B, discussed below, illustrates a workflow 200b involved in determining the Estimated Performance Change 265. As illustrated in FIG. 2A, Computer Program Code 205 is provided to Simulation Component 220, along with a Processing Unit Model 210a. As discussed above, in some embodiments, Computer Program Code 205 is actually executed on a processing unit, rather than having execution simulated. In an embodiment, Computer Program Code 205 is a program or application, or a portion thereof, that a user would like to optimize to run partially or entirely on one or more accelerator processing units.

In some embodiments, one or more Code Features 215 may also be provided to Simulation Component 220. In an embodiment, Code Features 215 includes the compiler that is to be used. For example, if Computer Program Code 205 is a higher level code that must be compiled and translated to machine language before execution, Simulation Component 220 may receive the selected compiler as a Code Feature 215, in order to ensure the simulation is accurate. In some embodiments, Computer Program Code 205 is a low level code, such as assembly or machine code, that can be executed directly on a PU without translation or compiling. Similarly, in some embodiments, Code Features 215 may include any input data required for simulation or execution of the Computer Program Code 205, the number of lines of code in the Computer Program Code 205, the number of each instruction type, and the like.

In some embodiments, Code Features 215 also includes flags to indicate sections of Computer Program Code 205 that the user believes would be better executed on an accelerator architecture, as opposed to on the current architecture. Additionally, in some embodiments the Code Features 215 include an indication as to which architecture(s) the user believes are good candidates for targeting. For example, based on experience, a user may suspect that a particular section of the Computer Program Code 205 would execute more rapidly or efficiently on a GPU instead of a CPU. Similarly, in an embodiment, the Code Features 215 may include a flag indicating that the user suspects that a section of code, if executed in parallel with another section of code, would be better executed on an accelerator hardware, even if each section of code, when executed alone, is better executed on the original hardware. In some embodiments, the Code Features 215 may also include the expected runtime or efficiency of one or more portions of the Computer Program Code 205 when executed on the processing unit which it was intended to be executed on.

As illustrated in FIG. 2A, Simulation Component 220 receives the Computer Program Code 205, Code Features 215, and the intended Processing Unit Model 210a, and simulates execution of the Computer Program Code 205. During execution, one or more Performance Characteristics 225 are generated and updated. For example, in an embodiment, the Performance Characteristics 225 are updated based on one or more hardware performance counters. In an embodiment, hardware performance counters are special-purpose registers that count hardware-related activities within the computing system during execution of code. Of course, if the Computer Program Code 205 is being simulated rather than actually executed on a hardware module, the Simulation Component 220 may also simulate these hardware performance calculators. The available hardware performance counters may vary based on the Processing Unit Model 210a selected.

In an embodiment, Performance Characteristics 225, which are clustered to generate dynamic hardware behaviors or Code Clusters 235, generally include any event or activity occurring at the hardware level of a processing unit during execution of computer code. In various embodiments, the Performance Characteristics 225 may include the runtime of the code, the number of instructions executed, the number of each type of instruction that is executed, the number of branches that occur in the code, the number of cache misses and hits, and the like.

In an embodiment, the runtime of the code may include the total runtime, or the runtime of individual portions of the Computer Program Code 205. In an embodiment, the number of instructions executed may include a count of all instructions that are executed during execution of the entire Computer Program Code 205, or may include counts of the instructions executed during each of several portions of the Computer Program Code 205. Similarly, in an embodiment, the number of each type of instruction may include the total number of each type, the number of each type during one or more portions of execution, and the like. In an embodiment, the different types of instruction include any instruction in the instruction set for the Processing Unit Model 210a architecture. For example, the types of instructions may include floating point operations, stores, loads, arithmetic, Boolean operations, and the like.

In some embodiments, Performance Characteristics may include a count for subtypes within a broader category of instruction, or may only include the broader category. For example, in some embodiments, Clustering Component 230 monitors the number of floating point operations. In other embodiments, Clustering Component 230 monitors the number of 32-bit floating point operations as a separate count from the number of 64-bit floating point operations. Similarly, in an embodiment, all arithmetic instructions are counted together. In other embodiments, however, instructions that involve, for example, addition are counted separately from instructions involving, for example, division.

In an embodiment, in addition to monitoring the number of branches that occur in all or a portion of the Computer Program Code 205, Performance Characteristics 225 also includes the number of instructions that compose each branch. For example, in an embodiment, the number of instructions that compose each branch may affect how it will execute on an accelerator processor, or how it is translated to the accelerator architecture, and thus may be tracked by Clustering Component 230.

In an embodiment, the number of cache misses or hits may be tracked for the entire Computer Program Code 205 or for one or more portions. In some embodiments, the Processing Unit Model 210a architecture may include more than one cache, such as an L1 cache and an L2 cache. In such an embodiment, the Performance Characteristics 225 may include a count of the hits and misses for each cache. As used herein, a cache is a memory location used by the processing unit to retrieve data or instructions without the need to refer to main memory. A cache hit refers to when the data or instruction required is found in the cache, which obviates the need to refer to main memory. Similarly, a cache miss refers to when data or instruction needed is not in the cache, which necessitates communications with main memory in order to retrieve or store the data or instruction.

In an embodiment, Clustering Component 230 monitors the Performance Characteristics 225 throughout execution. As illustrated, Clustering Component 230 monitors Performance Characteristics 225 during execution or simulation of Computer Program Code 205, and generates one or more Code Clusters 235. In an embodiment, each Code Cluster 235 represents a particular dynamic hardware behavior. In an embodiment, during execution of the Computer Program Code 205, Clustering Component 230 identifies windows of time when the Performance Characteristics 225 are similar to the Performance Characteristics 225 during other windows of time, and in order to generate each Code Cluster 235. That is, each Code Cluster 235 may be associated with a pattern of dynamic hardware behavior, and windows of time during which the execution of Computer Code 205 caused the hardware to exhibit behavior similar to the pattern are associated with the Code Cluster 235.

In an embodiment, once Clustering Component 230 identifies a window of time when the hardware (e.g., the Processing Unit Model 210a) was behaving in a similar manner to other windows of time represented in a given Code Cluster 235, for example, by monitoring Performance Characteristics 225, that window of time may be added to the Code Cluster 235. That is, Clustering Component 235 may add a reference to the sequence of instructions, or portion(s) of Computer Program Code 205 that were executed during the window which yielded the dynamic hardware behavior represented by the Code Cluster 235. In an embodiment, the Code Clusters 235 are therefore determined based on dynamic hardware behavior during a window of time, rather than on the particular function or portion of the Computer Program Code 205 that is being executed.

In some embodiments, the length of each window of time may be user selectable. In other embodiments, the particular clustering algorithm used may determine how long each window should be in order to generate the best clusters. That is, in order to ensure that each generated cluster is associated with dynamic behaviors that are as similar as possible. In various embodiments, the periods of time may differ among the disparate clusters, and may differ to some extent within a cluster as well. Similarly, in some embodiments, a user may predefine the number of clusters that should be created, or a maximum number of clusters. In other embodiments, the clustering algorithms determine the optimal number of clusters.

Therefore, in the illustrated embodiment, Clustering Component 230 does not identify "Function X" as belonging to a particular Code Cluster 235. Rather, Clustering Component 230 identifies a window of time based on the characteristics that the hardware exhibits, regardless of the underlying function being executed. This is explained in more detail below. Clustering Component 230 may generate Code Clusters 235 using any clustering algorithm. For example, the clustering may be achieved using a connectivity models such as hierarchical clustering, centroid models such as the k-means algorithm, distribution models including an expectation-maximization algorithm, machine learning models, and the like. Generally, any methodology capable of identifying clusters of dynamic hardware behavior can be used.

As illustrated in FIG. 2A, once Code Clusters 235 have been identified, Translation Component 240 generates Accelerator Clusters 250. In the illustrated embodiment, Translation Component 240 utilizes Code Translations 245, which may be stored, for example, in a database, to generate equivalent an Accelerator Cluster 250 for each Code Cluster 235. The Code Translations 245, which are discussed in more detail below, generally provide a translation for a set of instructions for a first processing unit architecture to a set of instructions for a second processing unit architecture.

In some embodiments, each instruction in the first architecture may have a single equivalent instruction in the second architecture. For example, a 32-bit floating point operation in a particular CPU architecture may be equivalent to a 32-bit floating point operation in a particular GPU architecture. In some embodiments, however, a single instruction may translate to multiple instructions, multiple instructions may translate to a single instruction, or multiple instructions may translate to multiple instructions. As illustrated, Translation Component 240 generates each Accelerator Cluster 250 to perform equivalent operations to a Code Cluster 235, but on an accelerator processing unit.

As will be discussed in more detail below, in an embodiment, each Accelerator Cluster 250 may be the equivalent of its respective Code Cluster 235, but each window of time during execution which is included in the Code Cluster 235 (for example, because the window of execution exhibited similar dynamic behaviors) may not be the exact equivalent of the Accelerator Cluster 250. This may be, for example, because each Code Cluster 235 approximates the instructions executed to cause the hardware to exhibit the dynamic behavior, but does not precisely match the instructions executed during any particular window of time during execution. For example, because Clustering Component 230 clusters similar hardware behaviors, the instructions causing those behaviors may likewise be similar but not identical, in some embodiments.

FIG. 2B illustrates a workflow 200b to predict the performance gains achieved by porting Computer Program Code 205 to an accelerator. In the illustrated embodiment, the Accelerator Clusters 250 generated by Translation Component 240 are provided to Simulation Component 220, along with the appropriate Processing Unit Model 210b. That is, for each Acceleration Cluster 250, the Processing Unit Model 210b representing the architecture that the Acceleration Cluster 250 is intended for is selected. As illustrated, the Simulation Component 220 simulates execution of the Accelerator Clusters 250 on the Processing Unit Model 210b, resulting in Accelerator Features 255. Similarly to the above discussion regarding simulating or executing the Computer Program Code 205, the Acceleration Clusters 250 may have execution simulated, or they may actually be executed by an appropriate hardware module. Regardless, during and after execution, Accelerator Features 255 are created.

In an embodiment, Processing Unit Model 210b is a parametric accelerator model that includes the hardware components of the accelerator processor unit, as well as the relationships among the hardware components. For example, in an embodiment, if the Processing Unit Model 210b is a GPU architecture, the Processing Unit Model 210b may include the number of streaming multi-processors, number of warp schedulers per streaming multiprocessor, global memory clock frequency, and the like.

Accelerator Features 255 include features or results of execution of each Accelerator Cluster 255. For example, in an embodiment, Accelerator Features 255 include the runtime for each Accelerator Cluster 250, the number of instructions included in each Accelerator Cluster 250, the efficiency and reliability of each Accelerator Cluster 250, and the like. As illustrated, Prediction Component 260 receives and compares Accelerator Features 255 and some Code Features 215 to predict the Estimated Performance Change 265. In an embodiment, this prediction involves comparing the runtime of each Code Cluster 235 and its corresponding Accelerator Cluster 250 to identify how much the runtime is increased or decreased by the translation. In embodiments, this may be determined in terms of an amount of time reduced (e.g., 500 microseconds faster), or in terms of a factor of reduction (e.g., 1.6 times faster). In some embodiments, the Estimated Performance Change 265 also includes other comparisons, such as a change in efficiency, reliability, and the like.

Figure 3:
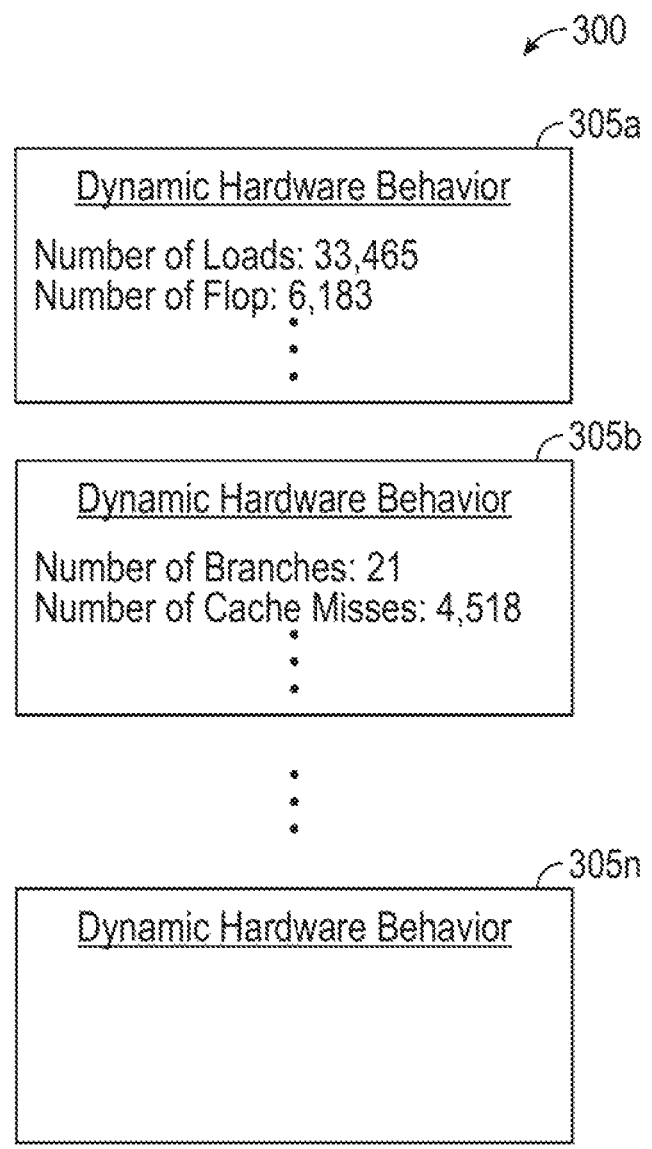
FIG. 3 illustrates dynamic hardware behavior clusters, according to an embodiment disclosed herein.

FIG. 3 illustrates a group 300 of Dynamic Hardware Behaviors 305a-N, according to an embodiment disclosed herein. As illustrated, each Dynamic Hardware Behavior 305a-N is identified by Clustering Component 230, and corresponds to a Code Cluster 235. In the illustrated example, a first Dynamic Hardware Behavior 305a is characterized as having 33,465 load instructions and 6,183 floating point instructions. As illustrated by the set of dots indicating an ellipsis, there may of course be many other elements included as characterizing Dynamic Hardware Behavior 305a. As illustrated, Dynamic Hardware Behavior 305b is characterized as having 21 branches and 4,518 cache misses. As above, the set of dots representing an ellipsis indicates that additional other behaviors characterize the Dynamic Hardware Behavior 305b.

In an embodiment, there may be any number of Dynamic Hardware Behaviors 305a-N, as determined by Clustering Component 230. As discussed above, a Dynamic hardware Behavior 305N is identified by Clustering Component 230, based on monitoring the Performance Characteristics 225 of execution of Computer Program Code 205. For example, Clustering Component 230 may identify two or more windows of time during execution of the Computer Program Code 205 that all exhibit similar Performance Characteristics 225 (e.g., they included approximately the same number of total instructions, cache misses, cache hits, floating point operations, and the like). Based on this identification, Clustering Component 230 identifies that dynamic behavior as a Dynamic Hardware Behavior 305N, and further identifies other windows of execution where the hardware (or simulated hardware) exhibited similar behavior.

In an embodiment, the degree of similarity required between windows of time during execution before they are clustered into a single Dynamic Hardware Behavior 305N may vary based on user-defined settings, the methodology used to cluster the data, or both. Thus, in an embodiment, the windows of time during execution (and the corresponding parts of Computer Program Code 205) may span a differing amount of time, contain differing numbers of instructions, a different number of cache misses, and the like. For example, a first window of time during execution may include 20,000 floating point operations and 5,000 cache misses, while a second window may include 21,000 floating point operations and 5,500 cache misses. Nevertheless, depending on the Performance Characteristics 225 and clustering algorithm used, the two windows may be included within the same Dynamic Hardware Behavior 305N.

Figure 4:
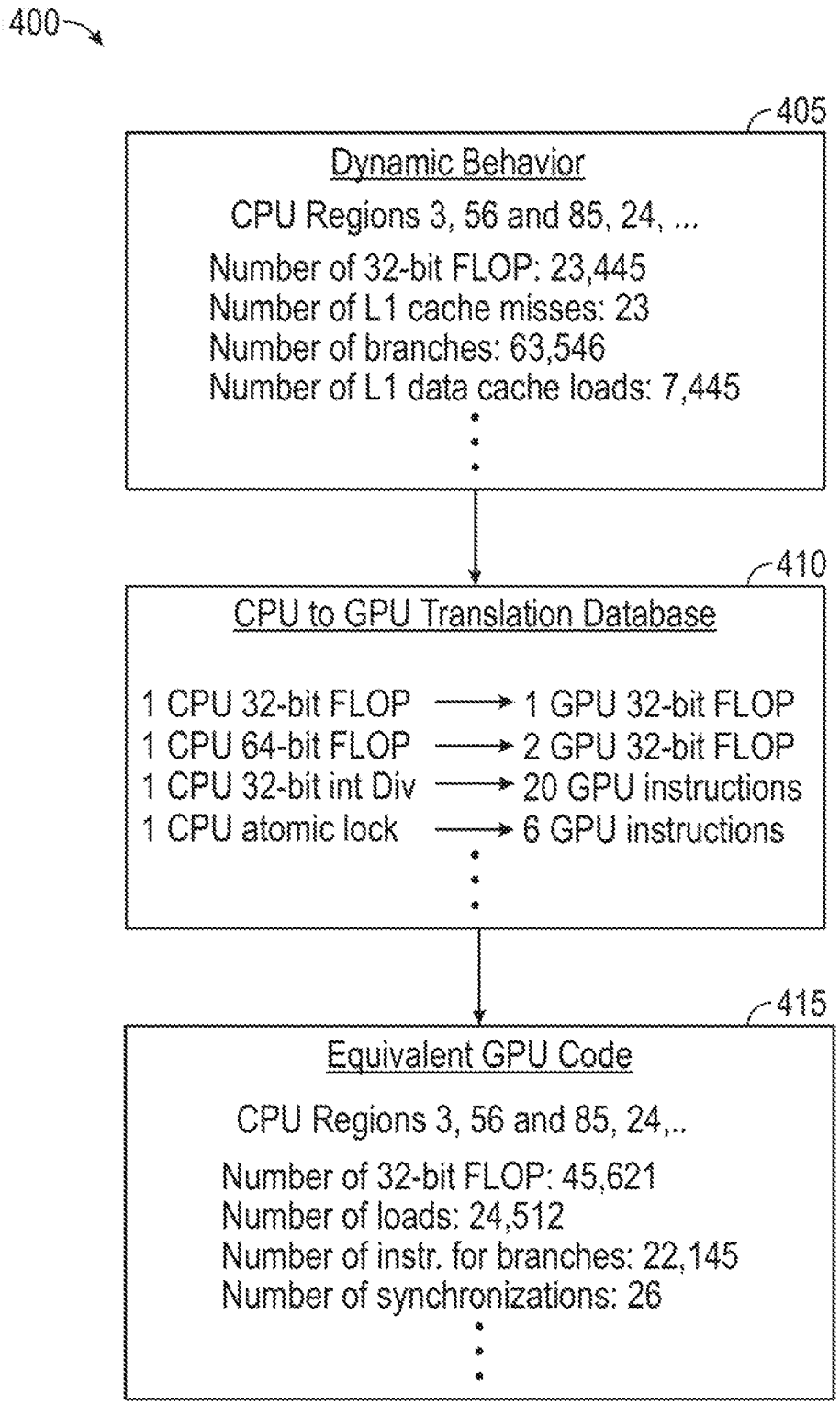
FIG. 4 illustrates a process to translate a CPU cluster to GPU code, according to an embodiment of the present disclosure.

FIG. 4 illustrates a process 400 to translate a CPU cluster to GPU code, according to an embodiment of the present disclosure. Of course, as discussed above, embodiments of the present disclosure can be used for porting computer code from any first architecture to any second architecture. For example, computer code for a CPU could be ported to a quantum computing processing unit, or to another CPU with a differing architecture/instruction set. Similarly, computer code for a GPU could be ported to execute on a CPU, an FPGA, a quantum computer, and the like. FIG. 4 illustrates a Dynamic Behavior 405 that includes approximately 23,445 32-bit floating point operations, 23 L1 cache misses, 63,546 branches, 7,445 L1 data cache loads, etc.

As illustrated, Dynamic Behavior 405 includes several CPU Regions. In the illustrated embodiment, the various CPU regions are portions of input computer code that were in the process of executing when the dynamic hardware behavior was observed. In an embodiment, the CPU regions can be any length, and different Dynamic Behavior clusters need not comprise CPU regions of the same length. Similarly, CPU regions within a single Dynamic Behavior 405 can be different lengths. In an embodiment, the CPU regions are defined based on the window of time that exhibited the particular Dynamic Behavior 405. For example, the instruction in computer code that marks the beginning of the CPU region or portion may be the first instruction executed in the identified window of time, and the last instruction executed in that window of time may mark the end of the region. In an embodiment, one or more instructions before and after the window may also be included in the CPU region.

Thus, in the illustrated embodiment, each CPU region indicates a subset of the instructions in the computer code that caused the processing unit hardware to exhibit the identified Dynamic Behavior 405. In the illustrated embodiment, CPU Regions 3, 56 and 85, 24, and others have been identified. Thus, when the portion of computer code indicated by CPU region 3 is executed, the dynamic hardware behavior exhibited by the CPU is similar to the dynamic hardware behavior exhibited when regions 56 and 85 are executed simultaneously, which is similar to when region 24 is executed. Of course, as discussed above, there may be any number of CPU code regions executed simultaneously in order to cause the identified hardware behavior.

In the illustrated embodiment of FIG. 4, a CPU to GPU Translation Database 410 is provided. The CPU to GPU Translation Database 410 defines the e equivalent instruction or set of instructions for the GPU architecture that correspond to each instruction or set of instructions in the CPU architecture. As discussed above, although the illustrated embodiment includes a CPU to GPU translation process, other embodiments may include translations between other architectures in the database, or may include a separate database for each translation. For example, in an embodiment, the system may include a GPU to CPU Translation Database, a CPU to Quantum Computer Translation Database, and the like.

In the illustrated embodiment, one 32-bit floating point operation in the CPU architecture's instruction set is equivalent to one 32-bit floating point operation in the GPU architecture's instruction set. That is, the data transformation that is achieved by one CPU 32-bit floating point operation can also be achieved using one GPU 32-bit floating point operation. Similarly, as illustrated, one 64-bit floating point operation in the CPU architecture is equivalent to two 32-bit floating point operations in the GPU architecture. That is, in the illustrated embodiment, two 32-bit floating point operations are required by the GPU architecture to achieve the same result as one 64-bit floating point operation in the CPU architecture.

Additionally, as illustrated, one 32-bit integer division instruction in the CPU architecture requires 20 instructions in the GPU architecture, and one atomic lock in the CPU architecture requires 6 instructions in the GPU architecture. Of course, depending on the particular architectures involved, the number and type of instructions that will be required to achieve the same result will vary. In an embodiment involving GPU architecture as the accelerator hardware, the equivalent code may be in CUDA, PTX, LLVM, or the like. In an embodiment, the Translation Database is used to translate the input code directly to assembly code of the accelerator architecture, e.g., directly to assembly code for the selected architecture. That is, in an embodiment, the CPU to GPU Translation Database translates the input CPU code directly into GPU assembly, without requiring a GPU compiler.

In an embodiment, the CPU to GPU Translation Database 410 is used to translate CPU instructions and CPU hardware registers directly into GPU assembly instructions and GPU hardware registers. Thus, the result of the translation process is assembly instruction that can be directly executed on the GPU architecture without further processing, along with identified hardware registers. Similarly, as above, in various embodiments, the source and destination architectures can be any computer processing unit architecture. In an embodiment, regardless of the particular destination architecture, the result of the translation process is low level assembly code (along with identified hardware registers) that can be directly executed on the accelerator hardware, without requiring additional compiling or processing. In an embodiment, the Translation Databases may be created using data gathered from reverse engineering the various accelerator hardware architectures, or by designing a new accelerator hardware architecture.

In the illustrated embodiment, Equivalent GPU Code 415 is generated. As illustrated, the Equivalent GPU Code 415 includes a reference to each CPU Region that it is approximately equivalent to. As discussed above, the CPU regions may differ somewhat from each other, as the Clustering Component 230 clusters dynamic hardware behaviors that are similar, but not necessarily identical, and does not consider the actual functions or operations. Thus, in an embodiment, although the term "equivalent" is used to refer to the Equivalent GPU Code 415, the generated Equivalent GPU Code 415 may not actually perform identical calculations and transformations to every CPU region in the Dynamic Behavior 405.

Rather, in an embodiment, the Equivalent GPU Code 415 represents the instructions required to carry out the average, mean, median, or representative CPU region. Thus, in an embodiment, once a Dynamic Behavior cluster 405 has been determined, e.g., because all of the CPU regions in it cause the hardware to exhibit similar Performance Characteristics 225, the definition of the Dynamic Behavior 405 can be updated to reflect each region in the cluster. That is, the "typical," "average," "median," "mean," or "representative" window of execution (or CPU region) that corresponds to Dynamic Behavior 405 has 23,445 32-bit floating point operations, but any given CPU region in the cluster may have more or less.

Thus, in an embodiment, the Equivalent GPU Code 415 contains instructions equivalent to the "typical" instructions of a CPU code region associated with Dynamic Behavior 405, but not necessarily equivalent to any particular CPU Region or window of time that corresponds to that Dynamic Behavior 405. As illustrated, the Equivalent GPU Code 415 includes 45,621 32-bit floating point operations, 24,512 loads, 22,145 instructions for branches, 26 synchronizations, and the like. The difference between the instructions in the Equivalent GPU Code 415 and Dynamic Behavior 405 is due to the translation rules found in CPU to GPU Translation Database 410. In the illustrated embodiment, because the Equivalent GPU Code 415 is equivalent to the Dynamic Behavior 405, and therefore approximates each CPU region in Dynamic Behavior 405, the runtime, efficiency, reliability, and the like for execution of the Equivalent GPU Code 415 can be used to accurately predict or estimate the runtime, efficiency, reliability, and the like if those regions of CPU code were actually ported to the accelerator hardware individually, such that the accelerator hardware performed the exact operations represented by each CPU region.

In some embodiments, however, the Equivalent GPU Code 415 is actually equivalent to each CPU region. That is, in an embodiment, the Equivalent GPU Code 415, when executed on a GPU architecture, performs precisely the same operations and calculations as the respective CPU Region(s). Thus, in some embodiments, the runtime, efficiency, reliability, and the like for execution of the Equivalent GPU Code 415 may more closely predict (or may precisely match) the runtime, efficiency, reliability, and the like if each CPU region is executed on the accelerator hardware during normal execution. Although the illustrated embodiment of FIG. 4 shows a CPU to GPU translation, the above discussion can be applied to translation between any processing unit architectures.

Figure 5A:
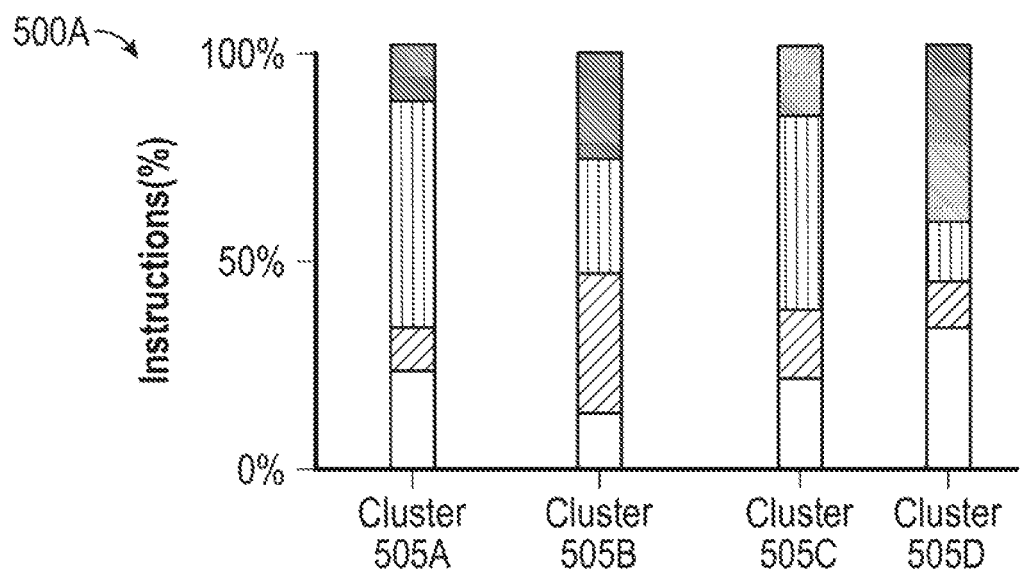
FIG. 5A is a stacked bar chart illustrating percentages of different instructions for several example clusters, according to one embodiment described herein.

FIG. 5A is a stacked bar chart 500A illustrating percentages of different instructions found in several example clusters. As illustrated, after clustering, four dynamic hardware behaviors, or Clusters 505A-D, have been identified. In the illustration, the different shadings for each Cluster 505A-D indicate the each type of instruction. That is, the white section, diagonal striped section, vertical stripe section, and black section of each Cluster 505A-D may indicate a particular type of instruction, and the size of the section indicates the percentage of the Cluster 505A-D that the instruction accounts for. For example, in an embodiment, the white section corresponds to the floating point instructions, the diagonal striped section corresponds to stores, the vertical stripe section corresponds to loads, and the black section corresponds to all other types of instruction. Of course, any number of categories can be used in various embodiments.

The chart 500A illustrates the instruction breakdown for each Cluster 505A-D for visualization purposes. In some embodiments, users may be provided with one or more charts similar to Chart 500A in order to visualize the performance of the clustering algorithm, so that any required changes can be made. As illustrated, Clusters 505A and 505C contain similar percentages of instruction types, but are still separate and distinct clusters. This may be due to a variety of reasons, such as the total number of instructions in each, the runtime of each, or any other Performance Characteristics 225 considered by Clustering Component 230.

Figure 5B:
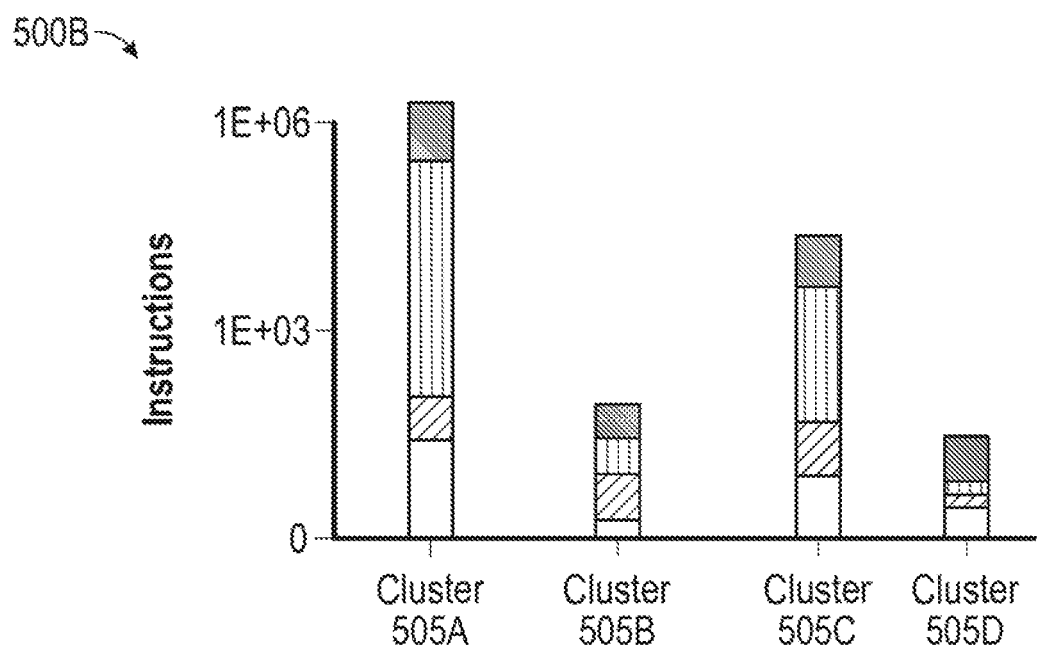
FIG. 5B is a stacked bar chart illustrating the total number of different instructions for several example clusters, according to one embodiment described herein.

FIG. 5B is a stacked bar chart 500B illustrating the total number of each instruction type for several example clusters. Chart 500B illustrates the same Clusters 505A-D as Chart 500A, but shows the number of instructions represented by each Cluster 505A-D, rather than the percentages of each type. As discussed above, although Clusters 505A and 505C have similar instruction makeups, they are different clusters. As can be seen in chart 500B, it is clear that Cluster 505A contains far more instructions than Cluster 505C, which may have contributed to the classification as different clusters. As discussed above, in some embodiments, one or more charts such as Chart 500B may be provided to the user to allow better visualization an understanding of the system.

Figure 5C:
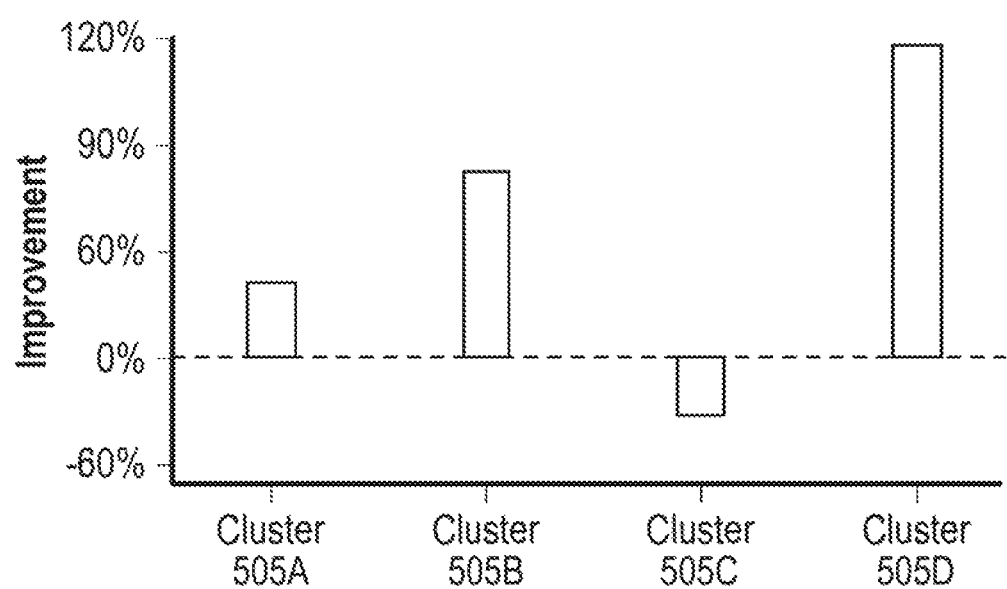
FIG. 5C is a bar chart illustrating the improvement of porting several example clusters to a different processing unit, according to one embodiment described herein.

FIG. 5C is a bar chart 500C illustrating the estimated improvement achieved by porting several example clusters to a different processing unit. For example, as discussed above with reference to FIG. 2B, the Accelerator Clusters 250 (e.g., Equivalent GPU Code 415), may either be executed and monitored, or may have execution simulated to determine the Accelerator Features 255, such as the runtime of each Accelerator Cluster 250. Similarly, as discussed above, Prediction Component 260 may compare these Accelerator Features 255 to the Code Features 215 to determine which Accelerator Clusters 250 are good candidates to port to the accelerator hardware.

Chart 500C illustrates the estimated acceleration achieved by porting each Cluster 505A-D to the accelerator hardware. Thus, as illustrated, Cluster 500B is expected to achieve an improvement lower than Cluster 505D, but higher than Cluster 505A. Additionally, as illustrated, Cluster 505C actually performs worse on the accelerator hardware, and thus is better left on the original processing unit. Similarly, as discussed above, the smaller improvement achieved by porting Cluster 505A may cause the user to decide not to port Cluster 505A to the accelerator, because it may take significant time and effort without achieving significant results.

In an embodiment, one or more charts similar to chart 500C can be provided to the user to enable intelligent and informed decision making. In determining whether to port code associated with a Cluster 505A-D to the accelerator architecture, the user may consider the improvement realized, in conjunction with the total number of CPU regions that correspond to the Cluster 505A-D, or the total runtime of the CPU Regions corresponding to the Cluster 505A-D. For example, if a particular Cluster 505A-D is only predicted to execute slightly faster on the accelerator architecture, but the Cluster 505A-D contains a large number of CPU regions, it may still be worthwhile to port the code because it will be executed many times. Similarly, even if a Cluster 505A-D is predicted to execute several times faster on the accelerator architecture, it may not be worth porting the code because the associated regions of CPU code only take a small amount of time to execute on the CPU.

In various embodiments, Chart 500C may illustrate various types of improvement. These may include a reduction in runtime, increase in efficiency or reliability, and the like. As discussed above, in an embodiment, Chart 500C illustrates estimated measure of improvement, and does not necessarily reflect the actual improvement achieved if the code is ported. This may be, for example, because the regions or portions of computer code that caused the hardware to exhibit the dynamic hardware behavior reflected in Cluster 505A-D are similar, but not exactly the same. Thus, in an embodiment, each region or portion may be translated separately in order to actually port the computer code to the accelerator hardware, and may differ to some extent. These differences may result in the actual performance improvement varying to some degree from the estimated performance improvements.

In other embodiments, however, as discussed above, the Accelerator Clusters 250 may more closely match, or may exactly match, the respective regions of computer code. In such an embodiment, the estimated performance improvement is likely to be much more accurate, and may exactly match the actual performance improvement achieved during normal execution of the program or application. Regardless of the particular embodiment, utilizing embodiments of the present disclosure to predict and estimate the improvements achieved by porting clusters of dynamic hardware behavior to accelerator hardware enables more accurate and reliable predictions. In turn, these predictions may enable users to better focus their time and energy when optimizing code to run on accelerator hardware.

Additionally, as discussed above, in some embodiments, the system clusters hardware behaviors rather than particular functions, and thereby improves efficiency significantly. Regardless of the particular function or section of program code, areas of code that cause the hardware to exhibit similar dynamic behavior are identified and clustered to better determine which areas of code should be ported. In many embodiments, these dynamic hardware behaviors become evident only when multiple areas of code are executed simultaneously or in parallel. Embodiments of the present disclosure enable identification of these dynamics and predictions for transferring these dynamics to a different hardware unit, and thereby significantly improve the runtime and efficiency of programs that are to be optimized.

Figure 6:
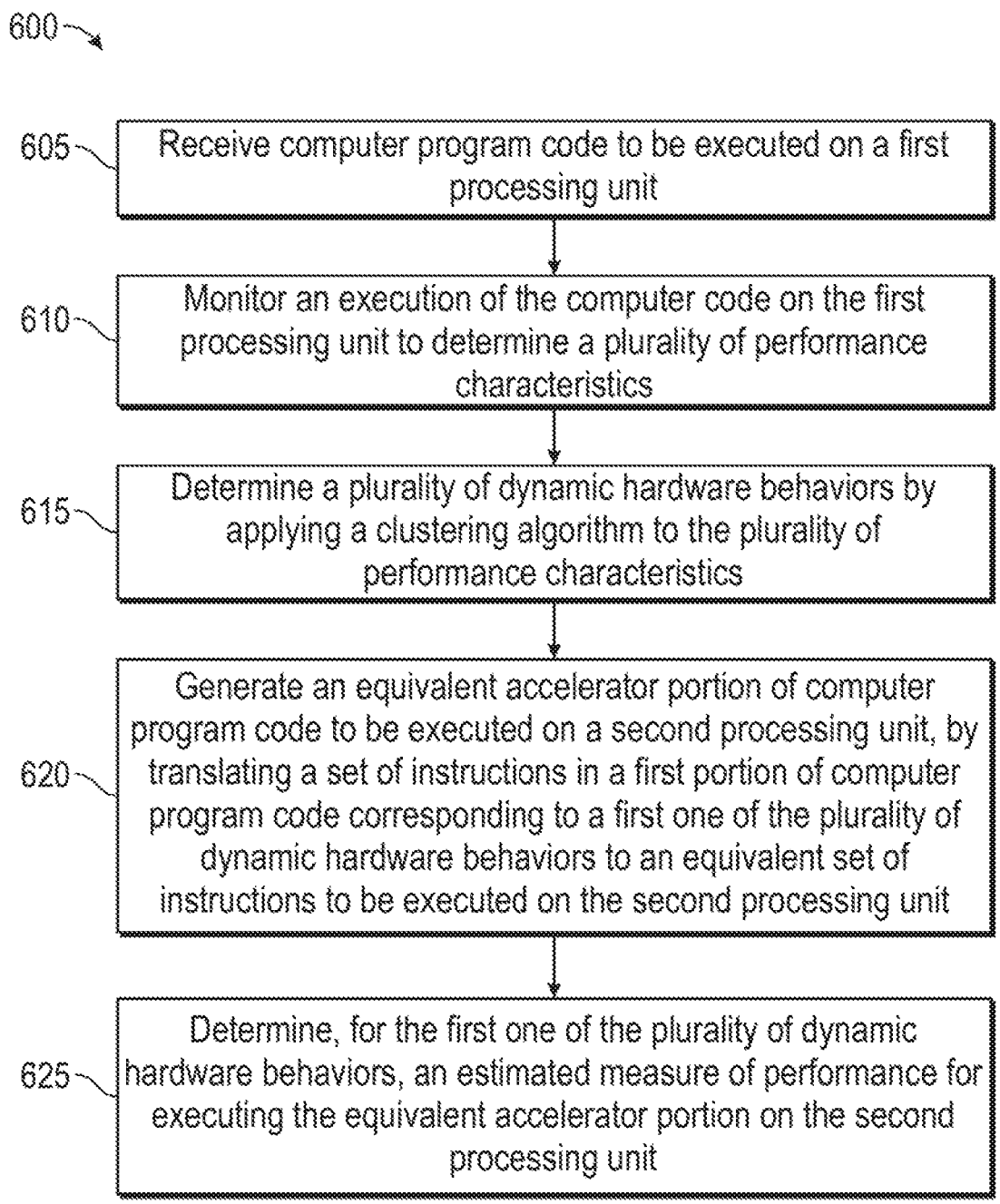
FIG. 6 is flow diagram illustrating a method of predicting accelerator performance for dynamic hardware behavior clusters, according to one embodiment of the present disclosure.

FIG. 6 is flow diagram illustrating a method 600 of predicting accelerator performance for dynamic hardware behavior clusters, according to one embodiment of the present disclosure. The method 600 begins at block 605, where Analysis Application 145 receives computer program code to be executed on a first processing unit. At block 610, Analysis Application 145 monitors an execution of the computer code on the first processing unit to determine a plurality of performance characteristics. At block 615, Clustering Component 155 determines a plurality of dynamic hardware behaviors by applying a clustering algorithm to the plurality of performance characteristics. At block 620, Translation Component 160 generates an equivalent accelerator portion of computer program code to be executed on a second processing unit, by translating a set of instructions in a first portion of computer program code corresponding to a first one of the plurality of dynamic hardware behaviors to an equivalent set of instructions to be executed on the second processing unit. Finally, at block 625, Analysis Application 145 determines, for the first one of the plurality of dynamic hardware behaviors, an estimated measure of performance for executing the equivalent accelerator portion on the second processing unit.

Figure 7:
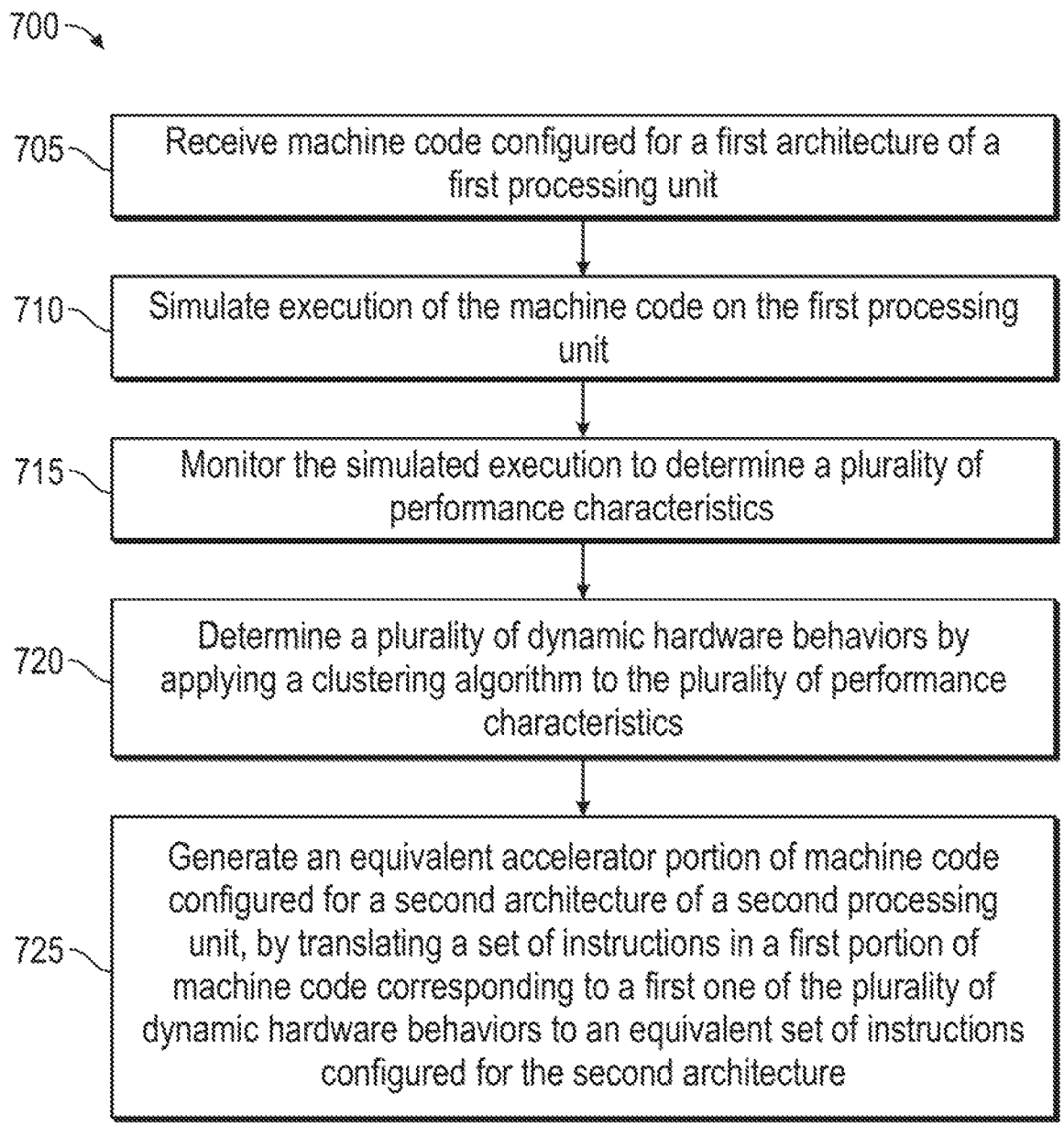
FIG. 7 is a flow diagram illustrating a method of translating dynamic hardware performance clusters into accelerator clusters, according to one embodiment disclosed herein.

FIG. 7 is a flow diagram illustrating a method 700 of translating dynamic hardware performance clusters into accelerator clusters, according to one embodiment disclosed herein. At block 705, Analysis Application 145 receives machine code configured for a first architecture of a first processing unit. At block 710, Analysis Application 145 simulates execution of the machine code on the first processing unit. Next, the simulated execution is monitored to determine a plurality of performance characteristics at block 715, and at block 720, Analysis Application 145 determines a plurality of dynamic hardware behaviors by applying a clustering algorithm to the plurality of performance characteristics. Finally, at block 725, Analysis Application 145 generates an equivalent accelerator portion of machine code configured for a second architecture of a second processing unit, by translating a set of instructions in a first portion of machine code corresponding to a first one of the plurality of dynamic hardware behaviors to an equivalent set of instructions configured for the second architecture.

Embodiments of the present disclosure enable accurate prediction of the improvements that can be realized by transferring clusters of dynamic behavior to an accelerator architecture. Using these predictions, it is possible to determine a highly accurate estimation of the resulting performance of the code, if all or portions of the computer code are in fact ported to execute on the accelerator processing unit. That is, in addition to determining how efficiently each individual portion of code will execute, one or more regions may be selected to translate to the accelerator architecture, and the overall runtime of the entire computer program code can be accurately estimated based on the summation of the individual parts.

As discussed in detail above, various embodiments of the present disclosure enable increased accuracy when estimating or predicting the improvements that can be achieved by porting all or portions of computer code to an accelerator architecture. Additionally, as will be discussed in more detail below, embodiments of the present disclosure enable improved execution of programs that have undergone such porting by dynamically switching execution of the program between multiple processing unit architectures during runtime of the program, which improves the efficiency and reduces the time required to execute the program.

Figure 8:
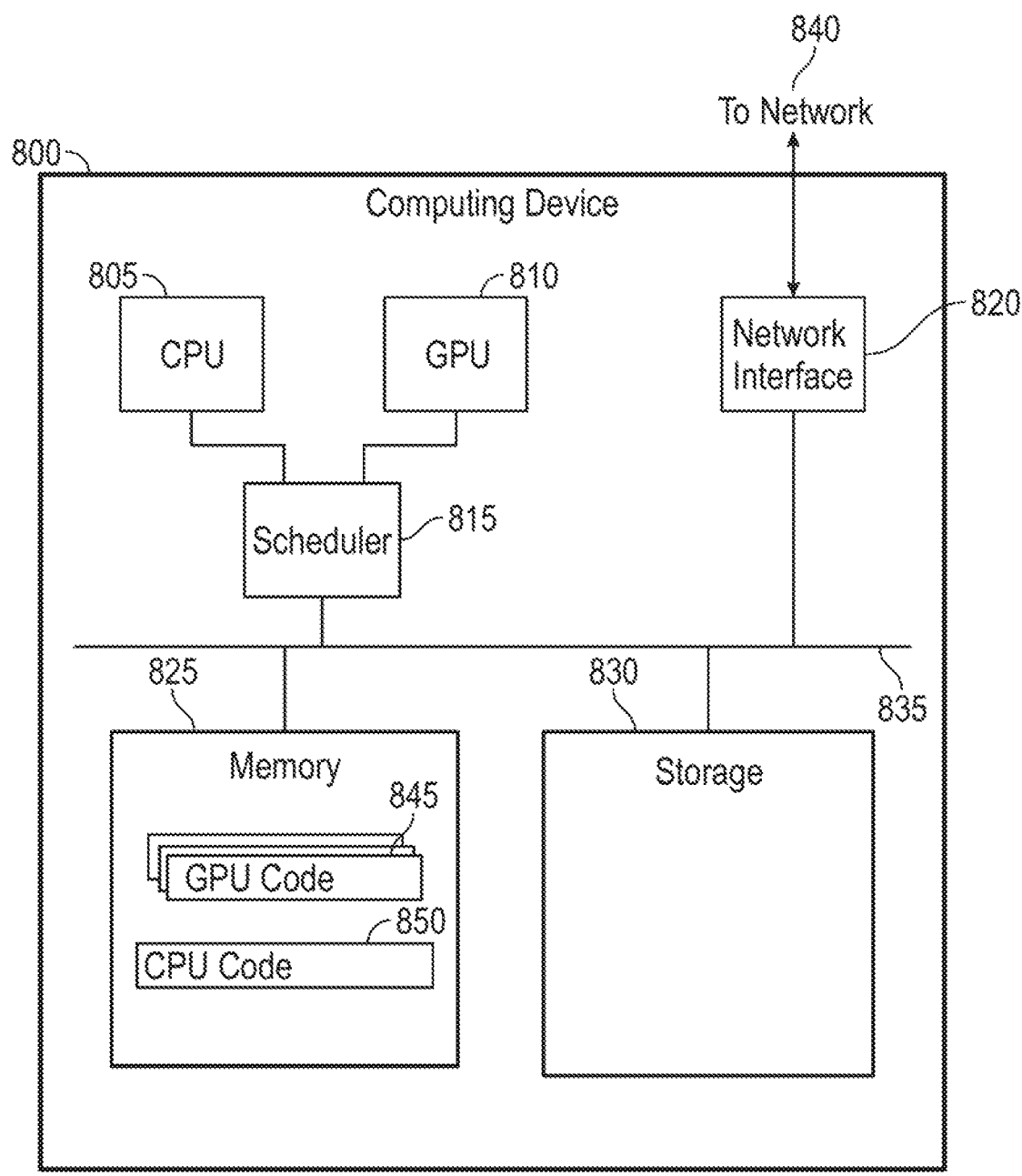
FIG. 8 is a block diagram illustrating a computing device capable of implementing an embodiment of the present disclosure.

FIG. 8 is a block diagram illustrating a Computing Device 800 capable of implementing an embodiment of the present disclosure. As illustrated, Computing Device 800 includes a CPU 805, a GPU 810, Scheduler 815, Network Interface 820, Memory 825, and Storage 830, as well as a bus or interconnect 835. Although not depicted, in some embodiments Computing Device 800 also includes an I/O Device Interface which may be used to interface with one or more I/O Devices such as a keyboard, mouse, display, and the like.

The CPU 805 and GPU 810 are configured to retrieve and execute programming instructions stored in the memory 825 and storage 830, through Scheduler 815. Similarly, the CPU 805 and GPU 810 are configured to store and retrieve application data residing in the memory 825 and storage 830. More particularly, Scheduler 815 is configured to execute programming instructions stored in Memory 825 and Storage 830, and determine whether the instructions should be executed by CPU 805 or GPU 810. Specifically, during execution of computer program code, Scheduler 815 dynamically determines whether the next instruction(s) or portion(s) of computer program code are more optimally executed on CPU 805 or GPU 810, and schedules execution of the computer program code accordingly, as will be discussed in more detail below. That is, if Scheduler 815 determines that the CPU 805 is better for execution of the subsequent portion of the computer program, CPU Code 850 is retrieved and scheduled for execution using CPU 805. If Scheduler 815 determines that GPU 810 is better for execution of the next portion of code, GPU Code 845 is retrieved and scheduled for execution on GPU 810.

The interconnect 835 is configured to move data, such as programming instructions and application data, between the Scheduler 815, storage unit 830, network interface 820, memory 825, and I/O Device Interface, if present. The CPU 805 is included to be representative of a single CPU, multiple CPUs, a single CPU having multiple processing cores, and the like. Similarly, GPU 810 is included to be representative of a single GPU, multiple GPUs, a single GPU having multiple processing cores, and the like. Memory 825 is generally included to be representative of a random access memory. The network interface 820 is configured to transmit data via the communications network 840. Although shown as a single unit, the storage 830 may be a combination of fixed and/or removable storage devices, such as fixed disc drives, removable memory cards, optical storage, SSD or flash memory devices, network attached storage (NAS), or connections to storage area-network (SAN) devices.

Additionally, though the illustrated embodiment includes only a single CPU 805 and GPU 810, in other embodiments, any other type of processing unit hardware may be included. For example, in some embodiments, Computing Device 800 may also include one or more quantum computing units, FPGA units, cryptographic accelerators, and the like. Generally, Computing Device 800 can dynamically switch code execution between CPU 805 and GPU 810, executing both CPU Code 850 and GPU Code 845, depending on which processing unit is more optimal. In various embodiments, depending on the goals and designs of the user(s) and the Computing Device 800, a processing unit may be more optimal because it executes the code more quickly, more reliably, more efficiently, while consuming less power or computing resources, and the like. In an embodiment, Computing Device 800 is also configured to execute some or all portions of CPU Code 850 and GPU Code 845 simultaneously on each respective processing unit.

Although illustrated as residing in Memory 825, CPU Code 850 and GPU Code 845 may reside in other locations in various embodiments, such as in a cache or other storage location. In the illustrated embodiment, CPU Code 850 has been processed to identify which portion(s) would be better-executed on GPU 810, and those portions have been translated to GPU Code portions 845. For example, CPU Code 850 may have been processed similarly to Computer Program Code 205 discussed above. In an embodiment, all of CPU Code 850 may have been translated into GPU Code 845, rather than only the identified dynamic behaviors. Additionally, as discussed above, in various embodiments, Memory 825 may also include equivalent accelerator code for any number of processing unit architectures.

In one embodiment, each GPU Code 845 is comparable an Accelerator Cluster 250. That is, in one embodiment, GPU Code 845 was created by translating a dynamic hardware behavior cluster to an equivalent accelerator cluster. However, as discussed above, in some embodiments, the Accelerator Clusters 250 are used to estimate performance of the code, and may not be perfect equivalents for every CPU region within a dynamic hardware behavior. In such an embodiment, each GPU Code portion 845 may be generated by translating portions of CPU Code 850 instructions and hardware registers into equivalent GPU Code 845 and hardware registers, such that each GPU Code portion 845 is executable by GPU 810 to complete the same calculations and operations as the corresponding portion of CPU Code 850.

That is, in some embodiments, there may be multiple GPU Code portions 845 for each identified dynamic hardware behavior, because each dynamic hardware behavior represents a cluster of regions of CPU Code 850 that caused the CPU hardware to exhibit similar behaviors. As discussed above, each region of the CPU Code 850 may contain somewhat differing instructions and orderings, despite the similar hardware behavior, and thus may require different translations to achieve the same result. Thus, in an embodiment, once Accelerator Clusters 250 have been generated and processed to determine which Dynamic Hardware Behaviors 305A-N should be ported to an accelerator processing unit, the specific CPU Code 850 regions corresponding to the selected Dynamic Hardware Behaviors 305A-N can be translated to GPU Code 845 portions that perform identical operations.

Figure 9:
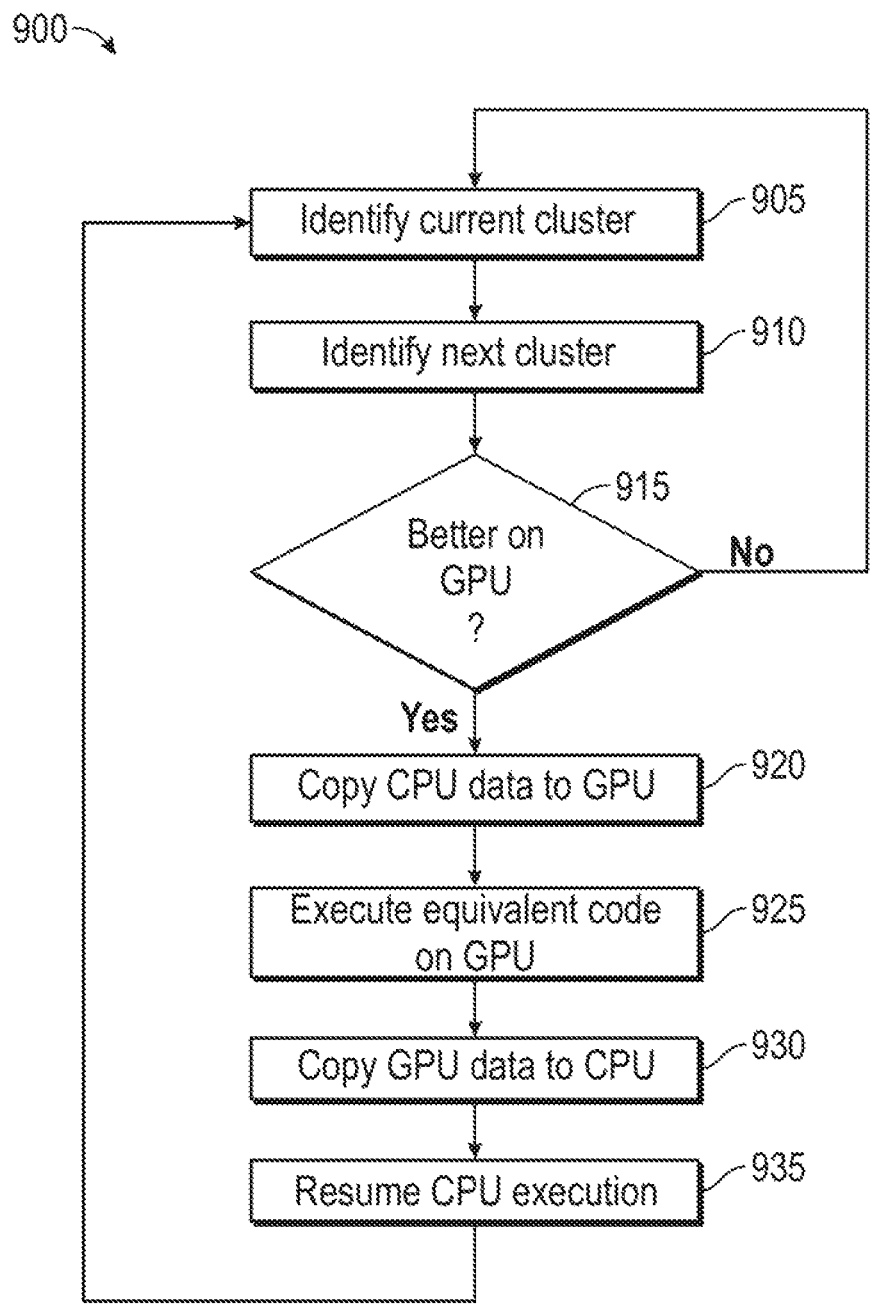
FIG. 9 is a flow diagram illustrating a method of dynamically switching execution of computer code between processing units, according to one embodiment disclosed herein.

FIG. 9 is a flow diagram illustrating a method 900 of dynamically switching execution of computer code between processing units during execution of a program, according to one embodiment disclosed herein. As illustrated, the method 900 begins at block 905, where the current cluster is identified during execution of CPU Code 850 on CPU 805, for example, by Scheduler 815 or some other component that monitors execution. That is, as illustrated, Scheduler 815 identifies which dynamic hardware behavior cluster is currently ongoing. In an embodiment, the current cluster is identified by monitoring Performance Characteristics 225, as discussed above. That is, in an embodiment, events or activities occurring at the hardware level of a processing unit during execution, such as those indicated by hardware performance counters, are monitored in order to determine which dynamic behavior the hardware is currently exhibiting.

In some embodiments, the current cluster is identified based on which portion of code is currently being executed. As discussed above, computer code (such as CPU Code 850) may be processed to identify various dynamic hardware behaviors, with each portion of computer code being associated with a particular dynamic hardware behavior cluster. Thus, in an embodiment, the current cluster may be identified by identifying which portion(s) of code are currently being executed. For example, as illustrated in FIG. 4, if CPU Region 3 is executing, it can be determined that Dynamic Behavior cluster 405 is occurring. Similarly, if CPU Regions 56 and 85 are executing simultaneously, it can be determined that Dynamic Behavior 405 is occurring.

At block 910, a subsequent cluster is identified, for example, the next cluster. That is, a dynamic behavior that will occur in the future is determined. In an embodiment, this identification can be performed based on the current cluster that has been identified, and based on one or more prior executions of the program code. For example, during processing of the program code to cluster the dynamic hardware behaviors, the Analysis Application 145 may learn an order in which the dynamic hardware behaviors occur during normal execution. Thus, in an embodiment, Scheduler 815 or another component may determine which cluster will occur next based on the cluster that is currently being executed. Similarly, in some embodiments, Scheduler 815 may refer to one or more prior clusters to determine which cluster is next.

In some embodiments, in addition to determining which cluster will come next, Scheduler 815 also determines when that cluster will begin. For example, as discussed above, Scheduler 815 may be configured to determine which instruction marks the end of a region of CPU Code 850 that is associated with the current cluster, and/or which instruction marks the beginning of a portion of CPU Code 850 that corresponds to the next cluster. At block 915, Scheduler 815 determines whether the identified next cluster would be better executed on the GPU 810, as opposed to CPU 805. This determination may be made, for example, based on a process such as the one illustrated in FIGS. 2A and 2B. In this way, Scheduler 815 can determine whether the subsequent cluster has been identified as more optimally executed on the GPU 810. If the subsequent cluster is not better executed on the GPU 810, the method 900 returns to block 905, where the method restarts. For example, as discussed above, the cluster may not be better executed on the GPU 810 for a variety of reasons, including because it would run more slowly on GPU 810, or because the efforts and time required to port the cluster to the GPU 810 would not justify the minimal improvements.

If, however, it is determined at block 915 that the next cluster would be more optimally executed on the GPU 810, the method 900 proceeds to block 920. At block 920, once the ongoing cluster ends and the identified next cluster is about to begin, data is copied from CPU 805 to GPU 810. For example, Scheduler 815 or some other component may take a snapshot of the CPU 805 at the register level, and apply that snapshot to the GPU 810 registers. That is, any required data that is being stored in the one or more CPU 805 hardware registers is copied, and stored in the appropriate GPU 810 registers. As discussed above, part of the porting or translation process from CPU Code 850 to GPU Code 845 may include translating the CPU registers into GPU registers. Thus, for all data that will be required by the cluster, the respective CPU register containing that data may be copied to the determined GPU register. In this way, execution of the program can continue smoothly, and the data is processed as if the entire execution was performed on the CPU 805.

At block 925, the equivalent code is executed on the GPU 810. For example, Scheduler 815 may retrieve the GPU Code 845 that corresponds to the portion of CPU Code 850 that would have been executed next. As illustrated, the Scheduler 815 knows the order of execution and what portion of CPU Code 850 would have been scheduled for execution following the portion that just completed execution. Additionally, Scheduler 815 can identify the equivalent GPU Code 845 to that portion. Thus, once all the relevant data has been transferred to the GPU 810, Scheduler 815 can begin executing the accelerator instructions in the appropriate GPU Code portion 845 to perform the same functions or operations, while improving runtime, efficiency, reliability, and the like.

Once the GPU Code 845 has completed execution, such that the cluster has completed and execution should be returned to the CPU 805, the required data is copied from the GPU 810 to CPU 805 at block 930. That is, similarly to above, the hardware registers of GPU 810 that are storing relevant or required data to execution of the program may be copied to the appropriate CPU 805 registers, such that execution of the program can continue with minimal interruption, as if it had continued execution on CPU 805 the entire time. The method continues to block 935, where CPU execution is resumed. That is, similarly to above, the portion of CPU Code 850 that follows the portion which was executed on GPU 810 is scheduled to begin execution on CPU 805. Finally, the method 900 returns to block 905, to begin again.

In the illustrated embodiment, because the required data is copied between the CPU and GPU as needed, the results of any functions performed remain the same as if the operations were executed entirely on the CPU 805. Similarly, because the GPU Code 845 was designed to exactly replicate the functionality of the portion of CPU Code 850 that it replaces, whatever program or application is being run is not interrupted or adjusted in any way. Of course, depending on the precise architecture of the two processing units and the code being executed, a portion of GPU Code 845 may contain more or fewer instructions than its respective portion of CPU Code 850. However, regardless of the number of instructions or the order they are executed, the overall functionality achieved remains the same.

Figure 10:
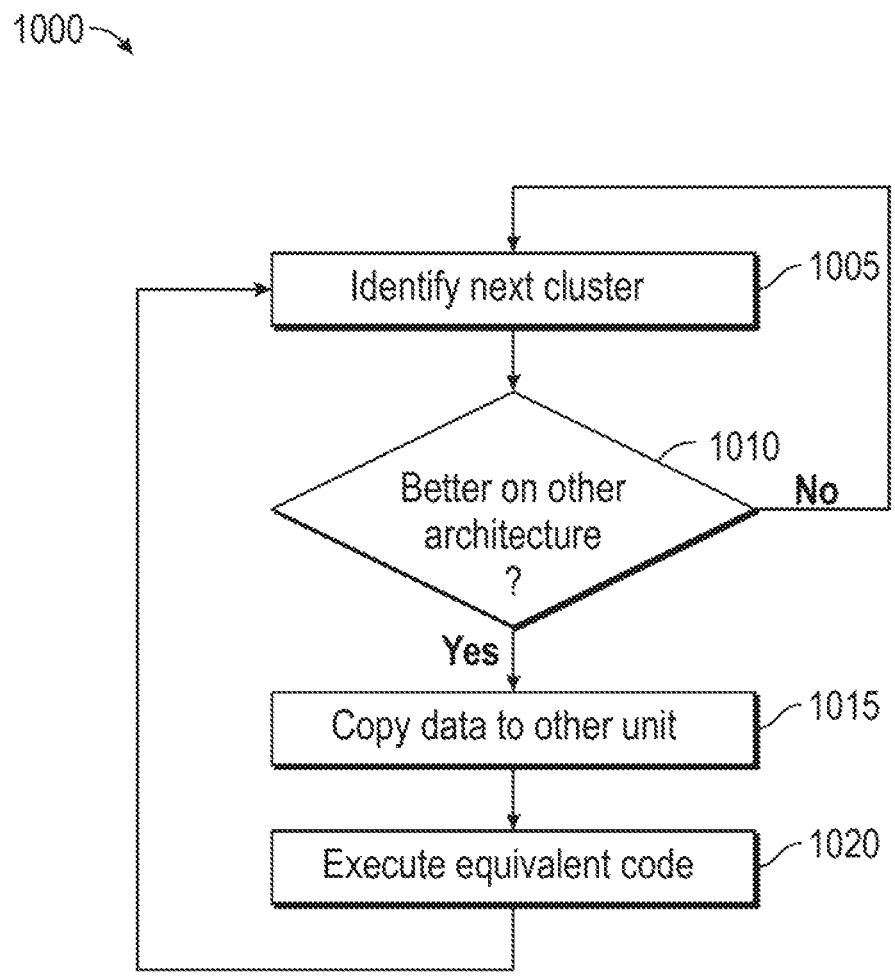
FIG. 10 is a flow diagram illustrating a method of dynamically switching execution of computer code between processing units, according to one embodiment disclosed herein.

FIG. 10 is a flow diagram illustrating a method 1000 of dynamically switching execution of computer code between processing units, according to one embodiment disclosed herein. In the illustrated embodiment, execution of computer code can be dynamically switched between any number of processing units. As illustrated, the method 1000 begins at block 1005, where the next cluster is identified. That is, as above, the cluster or dynamic hardware behavior that follows the current behavior can be determined in any number of ways. At block 1010, it is determined whether the subsequent cluster would be better executed on a processing unit architecture other than the processing unit that is currently executing the program. Similarly to above, this may be based on, for example, one or more previous executions of the computer code.

If the current processing unit is the best optimized for executing the computer code associated with the next dynamic hardware behavior, the method 1000 returns to block 1005, and begins again. If, however, there is a different processing unit architecture better able to execute the next cluster, the method 1000 proceeds to block 1015. For example, if it is determined based on previous processing that the subsequent cluster is more optimally executed on the CPU instead of the GPU that is currently executing the program, the method 1000 proceeds to block 1015. At block 1015, as above, the required data stored in registers of the current processing unit is copied and stored in the identified registers of the better processing unit. As discussed above, when porting computer code between processing unit architectures, the hardware registers may also be translated.

At block 1020, the equivalent code is executed on the better processing unit. For example, as discussed above, Scheduler 815 may schedule the next portion of code to execute on the selected processing unit. Finally, the method 1000 returns to block 1005, to determine whether the next cluster will require switching to a different processing unit architecture. For example, after execution of the current cluster finishes, the next cluster may require switching back to the original processing unit, or switching to a third processing unit.

In an embodiment, after determining that a different processing unit architecture would be better for executing the next cluster, the methods 900 and 1000 also include an additional step to verify that the needed translations are available. For example, Scheduler 815 may check to ensure that the code which is to be executed next has been translated into the language required by the different processing unit architecture (e.g., GPU Code 845). Additionally, Scheduler 815 may verify that the hardware registers of the first processing unit have been translated to hardware registers of the second processing unit, such that the relevant data can be transported to the second processing unit. In an embodiment, the methods 900 and 1000 only proceed if the translations are available. If not, the execution of the computer program code continues on the first processing unit.

In some embodiments, translation of the computer code to the different processing unit architecture may be performed dynamically when required, rather than or in addition to being completed before execution. For example, in such an embodiment, when it is determined that code associated with the upcoming cluster should execute on the different processing unit, the code may be translated during execution to create the equivalent code for the different processing unit. In this way, execution may be switched between multiple processing unit architectures without the need to store translations for each portion of code. In some embodiments, this dynamic translation is performed only for code which does not already have a translation prepared. For example, if the code portion has already been translated, the system may use that translation. If, however, there is no available translation, the system may dynamically generate one.

In some embodiments, determining whether the different processing unit architecture is better-suited for execution of code associated with the next cluster may similarly be performed dynamically during execution. For example, in an embodiment, once the dynamic hardware behavior cluster is identified, a machine learning model may be used to identify the optimal processing unit architecture for that cluster. In such an embodiment, the machine learning model may be trained by providing the model with dynamic hardware behaviors, along with an indication of a determined optimal processing unit architecture. After being trained with exemplars, the machine learning model can receive and process a new dynamic hardware behavior, and determine which processing unit architecture is likely the optimal selection. Additionally or alternatively, rather than identifying the cluster, the hardware behavior may be provided to one or more machine learning models continuously in order to determine if it is similar to any previously identified clusters, along with the optimal processing unit architecture for such a cluster.

Figure 11:
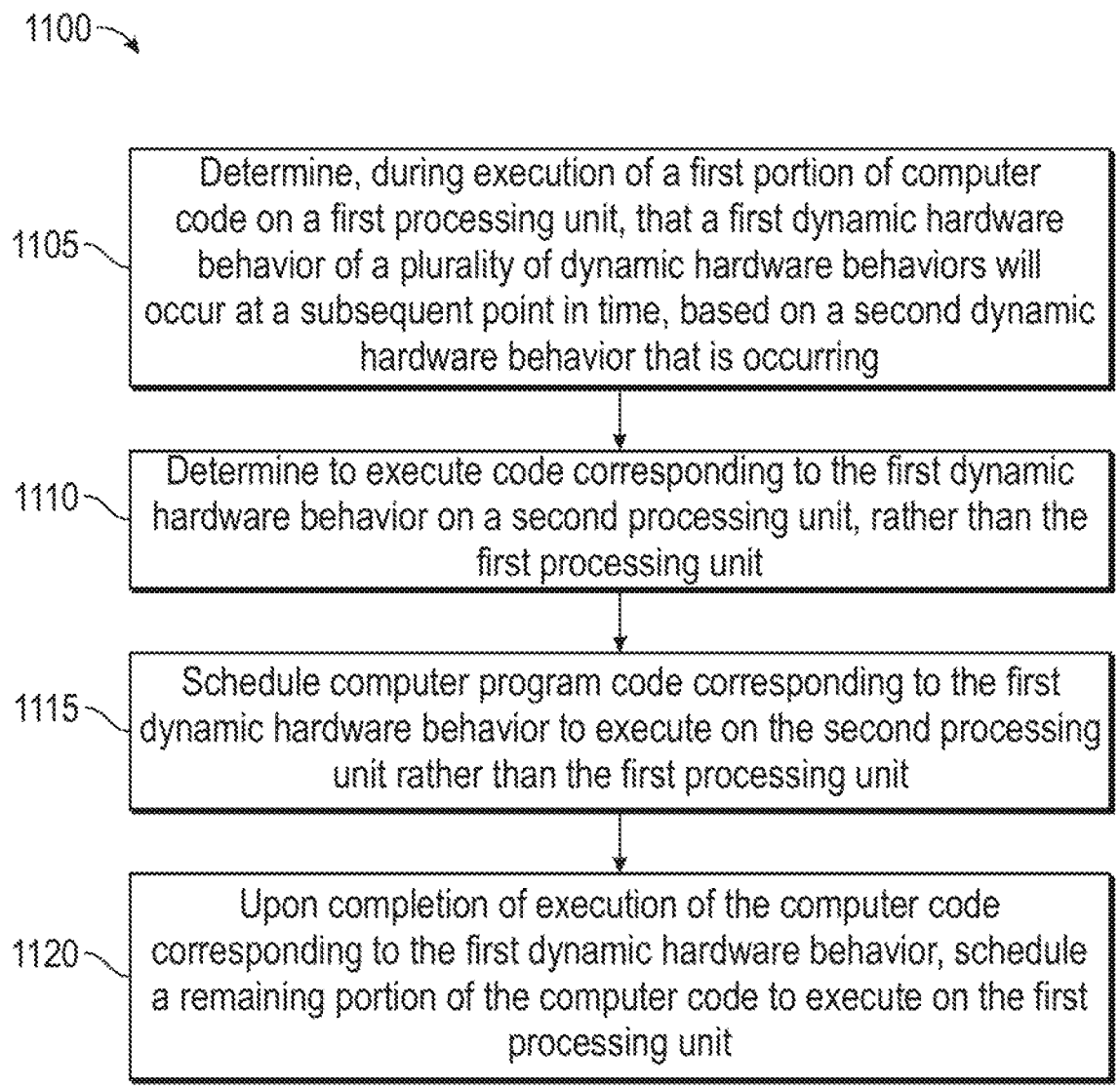
FIG. 11 is a flow diagram illustrating a method of dynamically switching execution of computer code between processing units, according to one embodiment disclosed herein.

FIG. 11 is a flow diagram illustrating a method 1100 of dynamically switching execution of computer code between processing units, according to one embodiment disclosed herein. The method 1100 begins at block 1105, where it is determined (for example, by Scheduler 815), during execution of a first portion of computer code on a first processing unit, that a first dynamic hardware behavior of a plurality of dynamic hardware behaviors will occur at a subsequent point in time, based on a second dynamic hardware behavior that is occurring. At block 1110, Scheduler 815 determines to execute code corresponding to the first dynamic hardware behavior on a second processing unit, rather than the first processing unit. This may be, for example, because during prior processing of the computer code, it was determined that the second processing unit would execute the code more rapidly.

At block 1115, Scheduler 815 schedules computer program code corresponding to the first dynamic hardware behavior to execute on the second processing unit rather than the first processing unit. Finally, at block 1120, upon completion of execution of the computer code corresponding to the first dynamic hardware behavior, Scheduler 815 schedules a remaining portion of the computer code to execute on the first processing unit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., Analysis Application 145) or related data available in the cloud. For example, the Analysis Application 145 could execute on a computing system in the cloud and process computer code to identify clusters that are better executed on a different architecture. Similarly, translated accelerator code could be stored and later retrieved at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving computer program code to be executed on a first processing unit;
monitoring an execution of the computer program code on the first processing unit to determine a plurality of performance characteristics;
determining a plurality of dynamic hardware behaviors by applying a clustering algorithm to the plurality of performance characteristics, wherein determining a first one of the plurality of dynamic hardware behaviors comprises clustering two or more windows of time during the execution based on corresponding performance characteristics of the first processing unit during the two or more windows of time;
generating a representative set of instructions to collectively represent the two or more windows of time;
generating an equivalent accelerator portion of computer program code by translating the representative set of instructions to an equivalent set of instructions to be executed on a second processing unit, wherein the equivalent set of instructions approximates the representative set of instructions but does not match a functionality of at least one of the two or more windows of time; and
determining, for the first one of the plurality of dynamic hardware behaviors, an estimated measure of performance for executing the equivalent accelerator portion on the second processing unit.

2. The method of claim 1, wherein monitoring the execution of the computer program code comprises simulating execution of the computer program code on the first processing unit and monitoring the simulated execution.

3. The method of claim 1, wherein generating the equivalent accelerator portion of computer program code comprises translating the representative set of instructions using a predefined translation database.

4. The method of claim 1, wherein determining, for the first one of the plurality of dynamic hardware behaviors, the estimated measure of performance comprises simulating execution of the equivalent accelerator portion on the second processing unit.

5. The method of claim 1, wherein determining the plurality of performance characteristics comprises monitoring a plurality of hardware performance counters of the first processing unit.

6. The method of claim 1, wherein the estimated measure of performance comprises a time required to execute the equivalent accelerator portion on the second processing unit.

7. The method of claim 1, wherein the estimated measure of performance comprises a reduction in a time required to execute the equivalent accelerator portion on the second processing unit, as compared to a time required to execute the representative set of instructions on the first processing unit.

8. The method of claim 1, wherein the estimated measure of performance comprises an efficiency of executing the equivalent accelerator portion on the second processing unit.

9. A computer-readable storage medium having computer-readable program code embodied therewith, the computer-readable program code executable by one or more computer processors to perform an operation comprising:
   receiving machine code configured for a first architecture of a first processing unit;
   simulating execution of the machine code on the first processing unit;
   monitoring the simulated execution to determine a plurality of performance characteristics;
   determining a plurality of dynamic hardware behaviors by applying a clustering algorithm to the plurality of performance characteristics, wherein determining a first one of the plurality of dynamic hardware behaviors comprises clustering two or more windows of time during the execution based on corresponding performance characteristics of the first processing unit during the two or more windows of time;
   generating a representative set of instructions to collectively represent the two or more windows of time; and
   generating an equivalent accelerator portion of machine code configured for a second architecture of a second processing unit, by translating the representative set of instructions to an equivalent set of instructions configured for the second architecture, wherein the equivalent set of instructions approximates the representative set of instructions but does not match a functionality of at least one of the two or more windows of time.

10. The computer-readable storage medium of claim 9, the operation further comprising:
   determining, for the first one of the plurality of dynamic hardware behaviors, an estimated measure of performance for executing the equivalent accelerator portion on the second processing unit.

11. The computer-readable storage medium of claim 10, wherein determining, for the first one of the plurality of dynamic hardware behaviors, the estimated measure of performance comprises simulating execution of the equivalent accelerator portion on the second processing unit.

12. The computer-readable storage medium of claim 10, wherein the estimated measure of performance comprises a time required to execute the equivalent accelerator portion on the second processing unit.

13. The computer-readable storage medium of claim 10, wherein the estimated measure of performance comprises a reduction in time required to execute the equivalent accelerator portion on the second processing unit, as compared to a time required to execute the representative set of instructions on the first processing unit.

14. The computer-readable storage medium of claim 10, wherein the estimated measure of performance comprises an efficiency of executing the equivalent accelerator portion on the second processing unit.

15. The computer-readable storage medium of claim 9, wherein determining the plurality of performance characteristics comprises monitoring a plurality of hardware performance counters of the first processing unit.

16. A system comprising:
   a processor; and
   a computer memory storing a program, which, when executed on the processor, performs an operation comprising:
      receiving computer program code to be executed on a first processing unit;
      monitoring an execution of the computer program code on the first processing unit to determine a plurality of performance characteristics;
      determining a plurality of dynamic hardware behaviors by applying a clustering algorithm to the plurality of performance characteristics, wherein determining a first one of the plurality of dynamic hardware behaviors comprises clustering two or more windows of time during the execution based on corresponding performance characteristics of the first processing unit during the two or more windows of time;
      generating a representative set of instructions to collectively represent the two or more windows of time;
      generating an equivalent accelerator portion of computer program code by translating the representative set of instructions to an equivalent set of instructions to be executed on a second processing unit, wherein the equivalent set of instructions approximates the representative set of instructions but does not match a functionality of at least one of the two or more windows of time; and
      determining, for the first one of the plurality of dynamic hardware behaviors, an estimated measure of performance for executing the equivalent accelerator portion on the second processing unit.

17. The system of claim 16, wherein determining, for the first one of the plurality of dynamic hardware behaviors, the estimated measure of performance comprises simulating execution of the equivalent accelerator portion on the second processing unit.

18. The system of claim 16, wherein the estimated measure of performance comprises a time required to execute the equivalent accelerator portion on the second processing unit.

19. The system of claim 16, wherein the estimated measure of performance comprises a reduction in a time required to execute the equivalent accelerator portion on the second processing unit, as compared to a time required to execute the representative set of instructions on the first processing unit.

20. The system of claim 16, wherein the estimated measure of performance comprises an efficiency of executing the equivalent accelerator portion on the second processing unit.

* * * * *